United States Patent [19]

Namikata et al.

[11] Patent Number: 5,996,003

[45] Date of Patent: Nov. 30, 1999

[54] CONFERENCING SYSTEM, TERMINAL APPARATUS COMMUNICATION METHOD AND STORAGE MEDIUM FOR STORING THE METHOD

[75] Inventors: Takeshi Namikata, Yokohama; Tsuneyoshi Takagi, Kawasaki, both of Japan

[73] Assignee: Canon Kabushiki Kaisha, Tokyo, Japan

[21] Appl. No.: 08/689,152

[22] Filed: Jul. 30, 1996

[30] Foreign Application Priority Data

Jul. 31, 1995 [JP] Japan .................................. 7-194940
Jul. 23, 1996 [JP] Japan .................................. 8-193208

[51] Int. Cl.$^6$ ............................ G06F 13/38; G06F 15/17; H04N 7/00
[52] U.S. Cl. ........................................... 709/205; 345/330
[58] Field of Search ....................... 395/200.34, 200.35, 395/329, 330; 709/204, 205

[56] References Cited

U.S. PATENT DOCUMENTS

| 5,204,936 | 4/1993 | Kaneko et al. | 395/11 |
| 5,245,553 | 9/1993 | Tanenbaum | 345/329 |
| 5,613,134 | 3/1997 | Lucus et al. | 345/329 |

FOREIGN PATENT DOCUMENTS

| 0645931 | 3/1995 | European Pat. Off. . |
| 0645932 | 3/1995 | European Pat. Off. . |

OTHER PUBLICATIONS

IBM Technical Disclosure Bulletin, vol. 34, No. 7A, Dec. 1, 1991, pp. 380–381, XP000255636 "Manual Multiple Source Selection in Computer Assisted Video Conference".

IEEE Transactions on Communications, vol. 39, No. 11, Nov. 1, 1991, pp. 1698–1708, XP000256985 Robinson J et al: "A Multimedia Interactive Conferencing Application for Personal Workstations".

Ziegler, C. et al.; "Multimedia Conferencing on Local Area Networks"; IEEE Computer 0018–9162/90/0900–0052$01.00; pp. 52–61, Sep. 1990.

Ahuja, S.R. et al.; "Coordination and Control of Multimedia Conferencing"; IEEE Communications Magazine 0163–6804/92/$03.00; pp. 38–43, May 1992.

Ensor, J.R. et al.; "Control Issues In Multimedia Conferencing"; IEEE CH2955–3/91/0000–0133$01.00; pp. 133–143, 1991.

Primary Examiner—Mark H. Rinehart
Attorney, Agent, or Firm—Fitzpatrick, Cella, Harper & Scinto

[57] ABSTRACT

There is provided a system for imitating distribution and explanation of conference documents in an actual conference so that a conference held in a desktop coferencing system can be made to approximate an actual conference. The system constituted of a transmitting side apparatus and at least one receiving side apparatus includes information management control units for managing the conference documents and information concerning the participants in the conference and controlling the whole system based on the management information, an input unit for inputting the conference documents as data, a transmitting unit and a receiving unit for exchanging data of the conference documents and the management information, a storing unit for storing the data of the conference documents received by the receiving unit, and document display units for displaying the conference documents. In such a system configuration, a conference document displayed in the transmitting side apparatus is transmitted to the receiving side apparatus so that the conference document can be not only stored in the storing unit, but also displayed to the document display unit. Thus, the transmitting side apparatus can distribute any conference document through a network to the receiving side apparatus.

16 Claims, 21 Drawing Sheets

FIG. 6A  61 IMAGE_DISTRIBUTE:
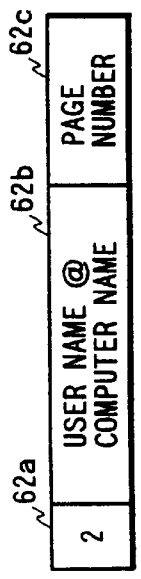
FIG. 6B  62 PAGE_CHANGE:
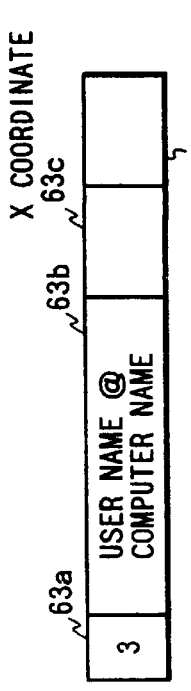
FIG. 6C  63 POINTER_MOTION:
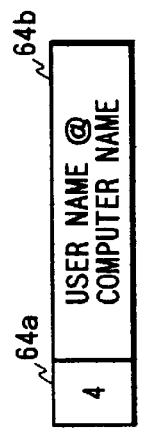
FIG. 6D  64 POINTER_INVISIBLE:
FIG. 6E  65 POINTER_VISIBLE:

FIG. 7

PARTICIPANT MANAGEMENT LIST ~70

| MEMBER (member) | ADDRESS (address) |
|---|---|
| USER1@WS1 | 150.61.31.xxx : 9000 |
| USER2@WS2 | 150.61.31.yyy : 9000 |
| USER3@WS3 | 150.61.31.zzz : 9002 |

PAGE (page) | 1 |

FIG. 9A

PARTICIPANT INFORMATION LIST ~90

| MEMBER (member) | PAGE (page) | POSITION (position) | TELEPOINTER (visible) | SYNCHRONISM (syncto) |
|---|---|---|---|---|
| USER1@WS1 | 1 | x1, y1 | — | — |
| USER2@WS2 | 2 | x2, y2 | TRUE | YES |
| USER3@WS3 | 3 | x3, y3 | FALSE | NO |

FIG. 9B

DOCUMENT INFORMATION LIST ~96

| PAGE | IMAGE FILE |
|---|---|
| 1 | FILE 1 |
| 2 | FILE 2 |
| 3 | FILE 3 |

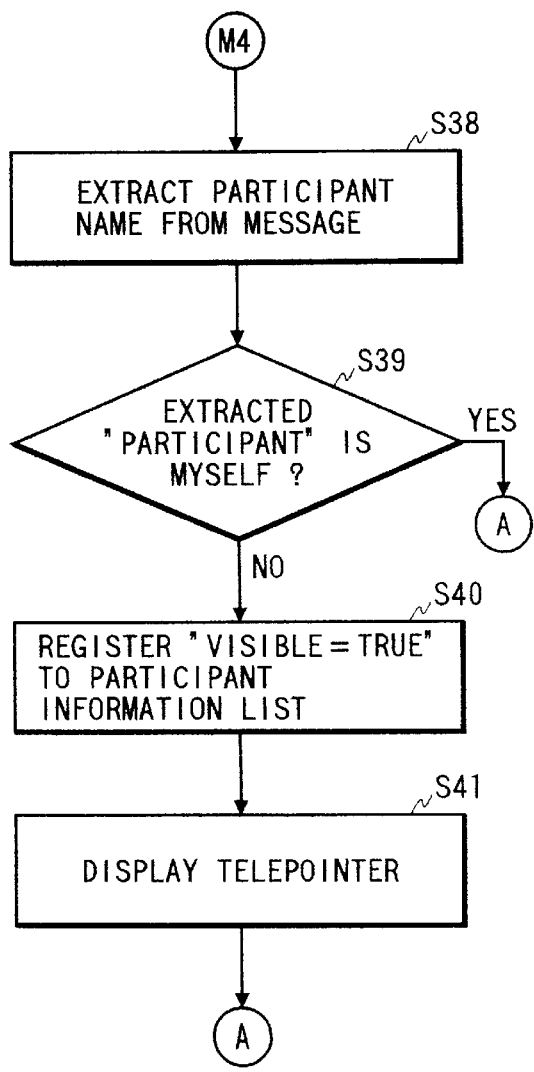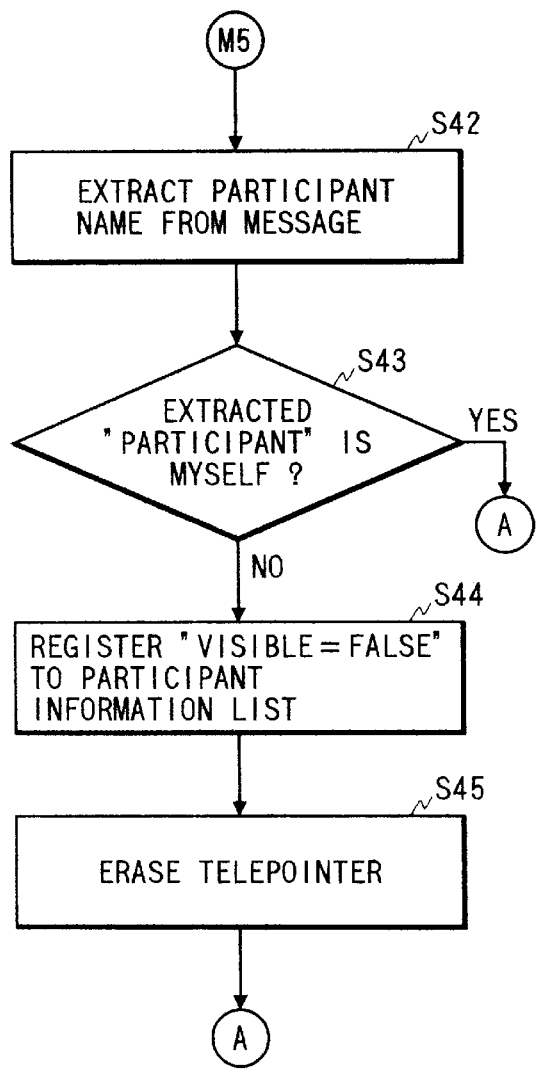

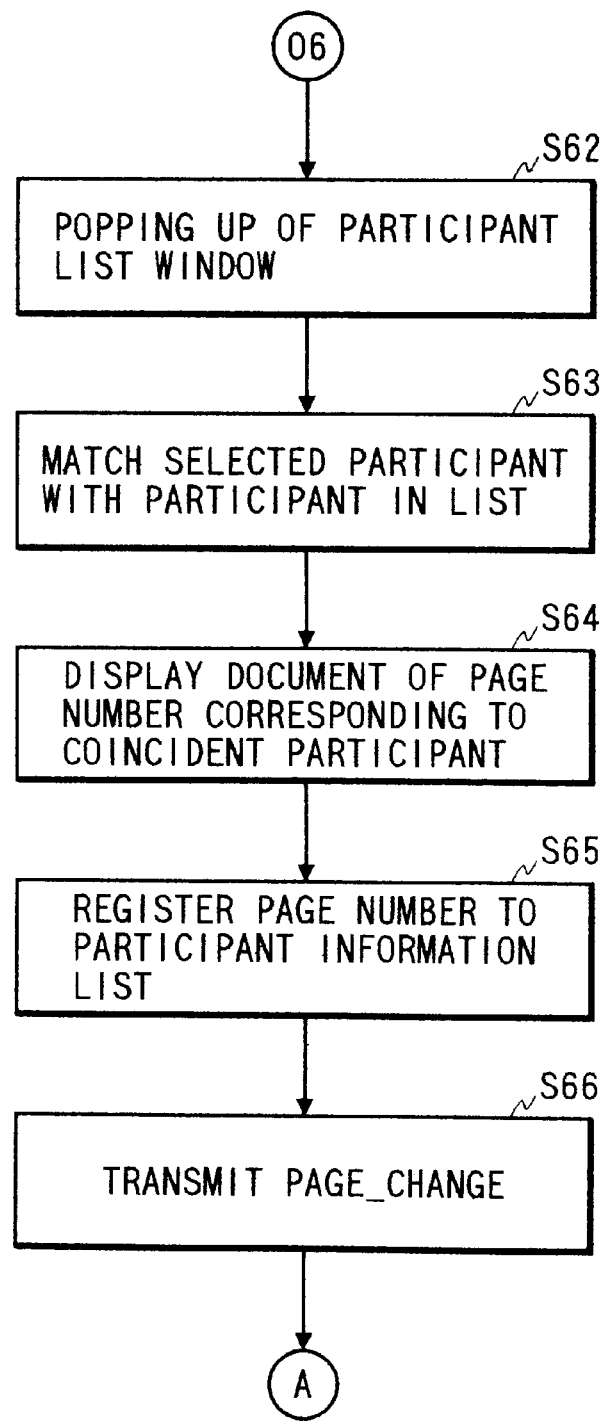

FIG. 23

DISPLAY AREA LIST ~230

| DISPLAY AREA ID | DISPLAY PAGE |
|---|---|
| 0 | 1 |
| 1 | 2 |
| 2 | 3 |

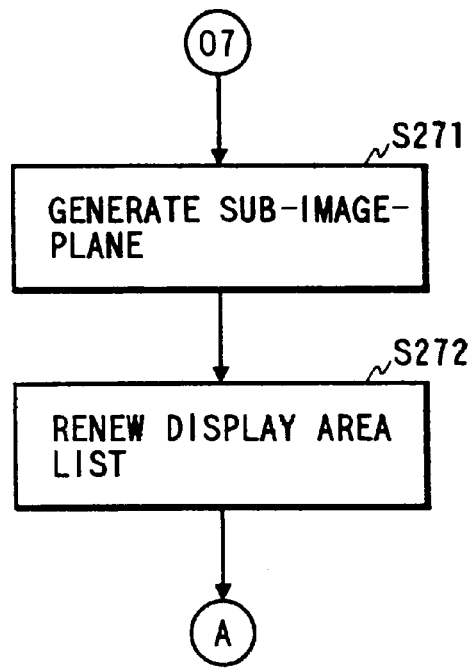
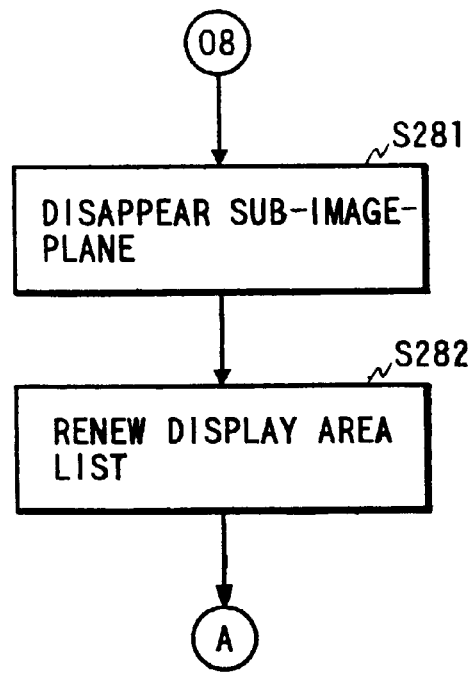

CONFERENCING SYSTEM, TERMINAL APPARATUS COMMUNICATION METHOD AND STORAGE MEDIUM FOR STORING THE METHOD

BACKGROUND OF THE INVENTION

1. Field of the Invention

The present invention relates to a conferencing system, a terminal apparatus, a communication method and a storage medium.

2. Related Background Art

In recent years, intense interest has been shown in work toward a desktop conferencing system using computers such as personal computers. Such a desktop conferencing system allows a plurality of terminals remote from one another to share the same application software or to commonly utilize an electronic blackboard by exchanging data to be used in respective personal computers together with video images and audio information.

In the desktop conferencing system, developments have been made to a video telephone for imitating existing identification of participants attaining an actual conference where the participants are gathered in a conference room, and to an image plane (image) shared device for imitating a discussion held on a white board.

In such a conventional image plane shared device, since all the participants always refer to the same image plane, when one of the participants takes a memo, e.g., he or she draws something on the image plane such as in an electronic blackboard, all the participants must share the drawing without fail. At an actual conference, however, sharing the same memo or drawing cannot take place. The present inventors assume that, when documents are distributed among the participants in the actual conference, the participants take the following actions:

(1) each participant refers to any of the documents freely and independently of the other participants, (2) each participant makes memos personally in the document, and (3) a document distributor points out a specific page and a specific point of the document to the participants for explaining the document so that each participant can refer to the document according to the explanation.

It is therefore required to provide an apparatus for imitating distribution and explanation of conference documents in an actual conference or supporting such functions in a desktop video conferencing system so that a conference held in the desktop conferencing system can be made to approximate the actual conference.

SUMMARY OF THE INVENTION

In consideration of the aforementioned points, an object of the present invention is to provide an improved conferencing system which is easier to use.

Another object of the present invention is to provide an improved terminal equipment which is easier to use.

Still another object of the present invention is to provide an improved communication method which is easier to use.

The present invention is accomplished by the provision of a common document display apparatus and a desktop conferencing system capable of faithfully imitating distribution and explanation of conference documents in an actual conference so that a conference held in the video conferencing system can be made to approximate the actual conference.

According to one aspect of the present invention, a common document display apparatus, which is used as a terminal connected through a network with other terminals for displaying common documents to be shared among a plurality of terminals, includes an information management control unit for managing information concerning the common documents and controlling the whole apparatus based on the management information; a transmitting unit for transmitting data of the common documents and the management information managed by the information management control unit; and a document display unit for displaying the common documents, in which the transmitting unit transmits the data of the common documents and the management information to all the terminals but it own terminal and the document display unit displays the common documents based on the data of the common documents.

According to another aspect of the present invention, a common document display apparatus, which is used as a terminal connected through a network with other terminals for displaying common documents to be shared among a plurality of terminals, includes an information management control unit for managing information concerning the common documents and controlling the whole apparatus based on the management information; a receiving unit for receiving data of the common documents and the management information both transmitted through the network; a storing unit for storing the data of the common documents received in the receiving unit; and a document list display unit for listing and displaying the common documents stored in the storing unit.

Yet another object of the present invention is to provide a conferencing system with a new function.

The above and other objects and features will become apparent from the following embodiments, which are discussed in connection with the drawings.

BRIEF DESCRIPTION OF THE DRAWINGS

FIGS. 6A to 6E are diagrams each showing an example of a data format of a message used in communication between processes in first to third embodiments of the present invention;

FIG. 7 is a table showing an example of information preserved in a participant management process in the first to third embodiments of the present invention;

FIGS. 9A and 9B are tables each showing an example of information preserved in the common document display process in the-first and third embodiments of the present invention;

FIG. 14 is a flowchart showing operation of the common document display process in the first to third embodiments of the present invention;

FIG. 15 is a flowchart showing operation of the common document display process in the first to third embodiments of the present invention;

FIG. 21 is a flowchart showing operation of the common document display process in the first to third embodiments of the present invention;

FIG. 23 is a table showing an example of information preserved in the participant management process in the second and third embodiments of the present invention;

FIG. 27 is a flowchart showing operation of the common document display process in the second and third embodiments of the present invention;

FIG. 28 is a flowchart showing operation of the common document display process in the second and third embodiments of the present invention.

DETAILED DESCRIPTION OF THE PREFERRED EMBODIMENTS

Figure 1:
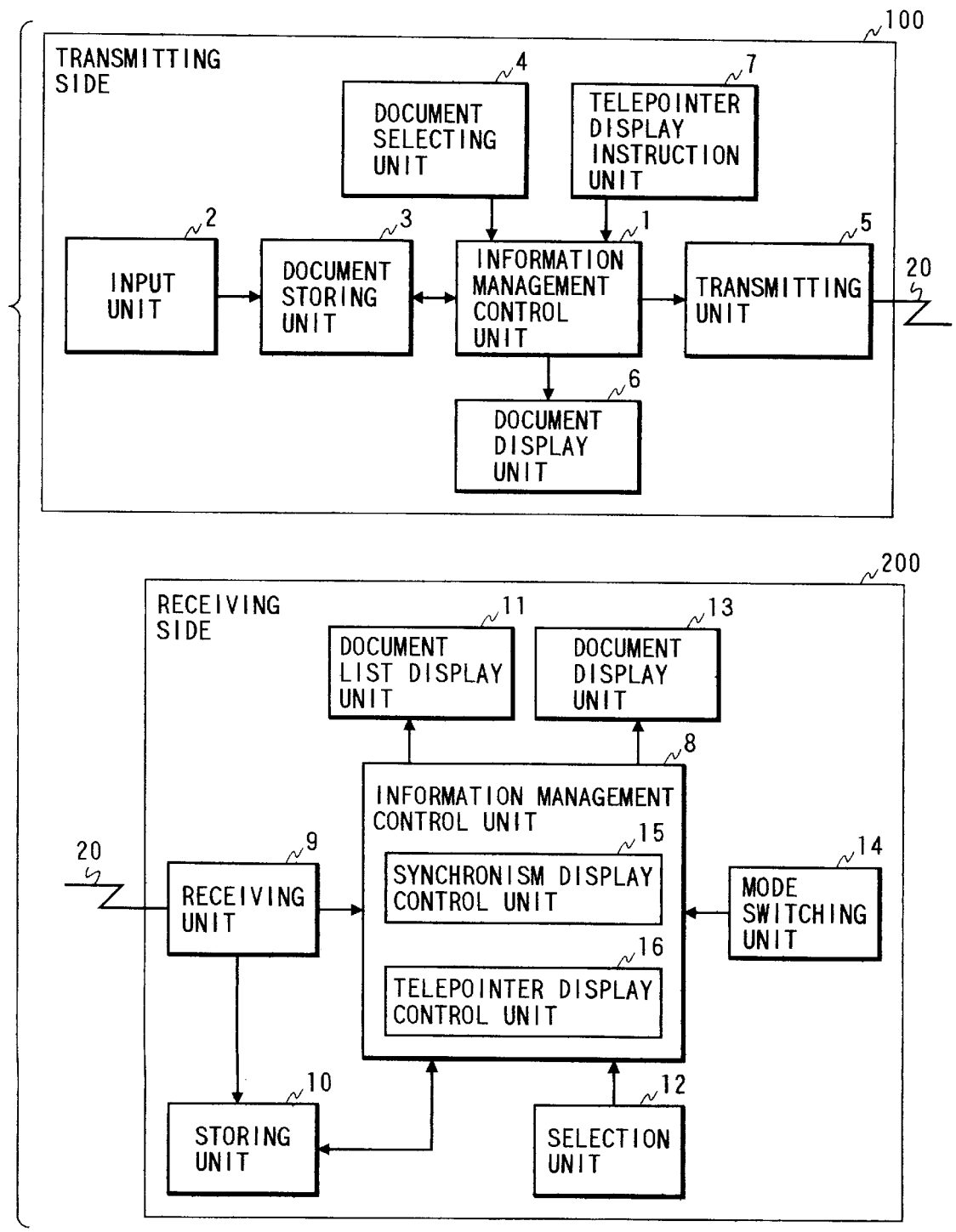
FIG. 1 is a block diagram showing elemental features of common document display apparatuses according to an embodiment of the present invention.

FIG. 1 is a block diagram showing main units of a desktop conferencing system using common document display apparatuses according to an embodiment of the present invention.

In FIG. 1, although the apparatus system is divided into a transmitting side apparatus 100 and a receiving side apparatus 200 for convenience sake, a transmitting side unit and a receiving side unit may be incorporated together in single apparatus. It should also be noted that, although each one of the transmitting side apparatus 100 and the receiving side apparatus 200 is provided in the common document display apparatus system of FIG. 1, the number of the apparatuses is not limited to this arrangement.

In the transmitting side apparatus 100, an information management control unit 1 manages conference documents to be shared among terminals and information concerning the participants in the desktop conference. The information management control unit 1 then controls the whole apparatus based on the management information. For example, the management information contains file names of the documents; page numbers; information for identifying the apparatus; information indicative of whether a synchronism mode, described later, is set or not; information indicative of whether a telepointer, described later, should be displayed or not; and information indicative of which position a pointer is located in the document displayed on the image plane.

An input unit 2 inputs data of the conference documents. The input unit 2 can be constituted with a scanner. The data of the documents input by the input unit 2, such as image data entered in a predetermined format, is stored in a document storing unit 3. The document storing unit 3 can store a plurality of document data.

A document selecting unit 4 selects any document out of the plurality of conference documents stored in the document storing unit 3. A transmitting unit 5 then transmits through a network 20 the document data selected by the document selecting unit 4 and necessary information in all the management information managed by the information management control unit 1.

A document display unit 6 displays a corresponding document based on the selected document data. The document data transmitted by the transmitting unit 5 and utilized by the document display unit 6 is data read by the information management control unit in accordance with instructions from the document selecting unit 4 to select a document out of the documents input by the input unit 2 and stored in the document storing unit 3.

A telepointer display instruction unit 7 then instructs the receiving side apparatus 200 as to whether or not a pointer (for pointing out a position in the document), which is being displayed on the document display unit 6 together with the document, should be displayed as a telepointer to the same position on the display image plane of the receiving side apparatus 200.

In the receiving side apparatus 200, an information management control unit 8 manages conference documents to be shared among terminals and information concerning the participants in the desktop conference, and controls the whole apparatus based on the management information in the same manner as in the transmitting side apparatus 100. A receiving unit 9 receives data of the conference documents and the management information both transmitted through the network 20.

The data of the conference documents received by the receiving unit 9 is stored in a storing unit 10. The storing unit 10 can store a plurality of document data as much as the document storing unit 3 can. A document list display unit 11 then lists and displays the conference documents stored in the storing unit 10. The document list display unit 11 displays respective documents specified with the management information managed by the information management control unit 8, for example, as icons indicative of image data of the conference documents.

According to such a system configuration, all the document data being displayed on the document display unit 6 of the transmitting side apparatus 100 can be transmitted from the transmitting side apparatus 100 to the receiving side apparatus 200 and stored in the storing unit 10 of the receiving side apparatus 200. When providing a plurality of receiving side apparatuses 200 in the system, all the document data can be transmitted to all the receiving side apparatuses 200 and stored in the storing unit 10 of each receiving side apparatus 200.

Such a system configuration allows a user of the transmitting side apparatus 100 to distribute conference documents through the network 20 to the other users remotely located. Also, each user of the receiving side apparatus 200 can receive the conference documents distributed through the network 20. It should be noted that a video conference can be held by exchanging predetermined management information among apparatuses after distributing all the necessary documents, the predetermined management information containing data of the conference documents and information indicative of which portion of the conference documents is being explained.

Returning to the receiving side apparatus 200, a selection unit 12 selects any one of the conference documents from the list of the conference documents displayed on the document list display unit 11. A document display unit 13 then displays a corresponding document based on the document data stored in the storing unit 10. In other words, the document display unit 13 reads the document data from the storing unit 10 under control of the information management control unit 8, and displays the corresponding document based on the read data.

An image area of the document display unit 13 to which the document is displayed is formed with two-layered structure. In the two-layered structure, when one layer is used for displaying the conference document, the other layer can be used for writing image data.

Such a two-layered structure of the image area allows all the participants to share the conference document displayed on the one layer, but not to share the image data written in on the other layer. Accordingly, such a conventional inconvenience as a memo written by a user of the receiving side apparatus 200 is shared by the other participants without fail can be eliminated, so that each participant can take a personal memo freely in any portion of the documents commonly distributed.

Continuously explaining the receiving side apparatus 200, a mode switching unit 14 switches over between modes indicative of whether or not the same document as being displayed on the document display unit 6 of the transmitting side apparatus 100 should be displayed to the document display unit 13 at all times. When an asynchronism mode is set by the mode switching unit 14, the information management control unit 8 controls the document display unit 13 to display the conference document selected by the selection unit 12. When selecting the synchronism mode, the information management control unit 8 controls the document display unit 13 to display the same document as being displayed on the document display unit 6 at all times.

A synchronism display control unit 15 provided in the information management control unit 8 executes the processing in the synchronism mode. The information management control unit 8 is also provided with a telepointer display control unit 16 for controlling the document display unit 13 to display, within the image area to which the document is displayed, a telepointer to the same position as a pointer is being displayed in the document display unit 6 of the transmitting side apparatus 100 when the telepointer display instruction unit 7 of the transmitting side apparatus 100 instructs the receiving side apparatus 200 to display the telepointer.

As such above, each user of the receiving side apparatus 200 can select any document out of the plurality of conference documents commonly distributed, and display the selected document to the document display unit 13 in the asynchronism mode. This allows the user to refer to any document in the plurality of distributed documents freely and independently of the other users or participants.

In the synchronism mode, the same document as being displayed by the transmitting side apparatus 100 is always displayed by the receiving side apparatus 200. The telepointer is also displayed by the document display unit 13 of the receiving side apparatus 200 at all times in the same position as the pointer pointing out a portion of the document is being displayed in the document display unit 6 of the transmitting side apparatus 100, and this allows the document distributor to point out a specific page and a specific portion of the document to the other participants for explaining the document so that each participant can refer to the document according to the explanation.

Figure 2:
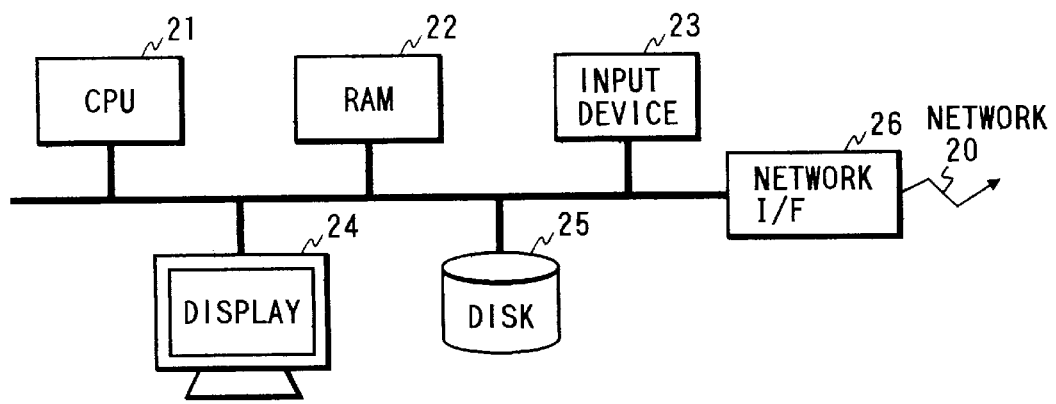
FIG. 2 is a diagram showing an exemplary hardware configuration of a common document display apparatus system according to an embodiment of the present invention.
Figure 3:
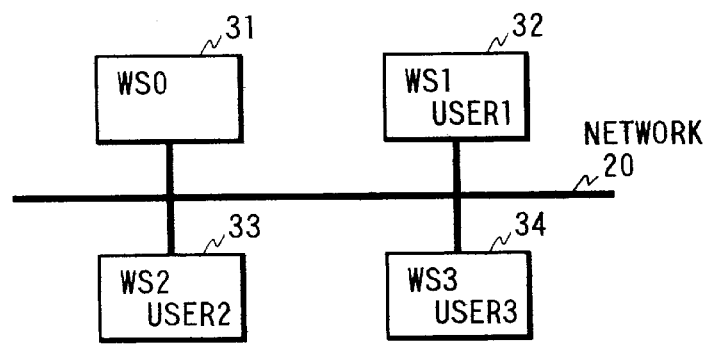
FIG. 3 is a diagram showing a network configuration for connecting a plurality of the common document display apparatuses according to the embodiment of the present invention.

FIGS. 2 and 3 show exemplary hardware configurations for carrying out the common document display apparatus system according to the embodiment of the present invention.

In FIG. 2, a CPU 21 controls the whole apparatus and a RAM stores necessary programs and the like. The CPU 21 and the RAM 22 constitute the information management control units 1, 8 of FIG. 1.

An input device 23 controls the apparatus based on information input thereby. For example, the embodiment uses a mouse as the input device 23. The mouse 23 is utilized in the document selecting unit 4, the telepointer display instruction unit 7, the selection unit 12 and the mode switching unit 14.

In FIG. 2, there are also shown a display 24, a hard disk 25 and a network I/F 26 for providing an interface with the network 20. These devices are used for the respective units of FIG. 1. In other words, the display 24 is used for the document display units 6, 13 and the document list display unit 11; the hard disk 25 is used for the document storing unit 3 and the storing unit 10; and the network I/F 26 is used for the transmitting unit 5 and the receiving unit 9.

A plurality of such computers constituted as shown in FIG. 2 are connected through the network 20, i.e., first to fourth computers 31, 32, 33 and 34 are connected through the network 20 as shown in FIG. 3. In FIG. 3, the computers are named WS0, WS1, WS2 and WS3, respectively. Further, the second to fourth computers 32, 33 and 34 are assigned to users attaining the conference named USER1, USER2 and USER3, respectively. Although the network system in the embodiment is constituted of the four computers, the number of computers to be connected through the network is not limited by this embodiment.

Figure 4:
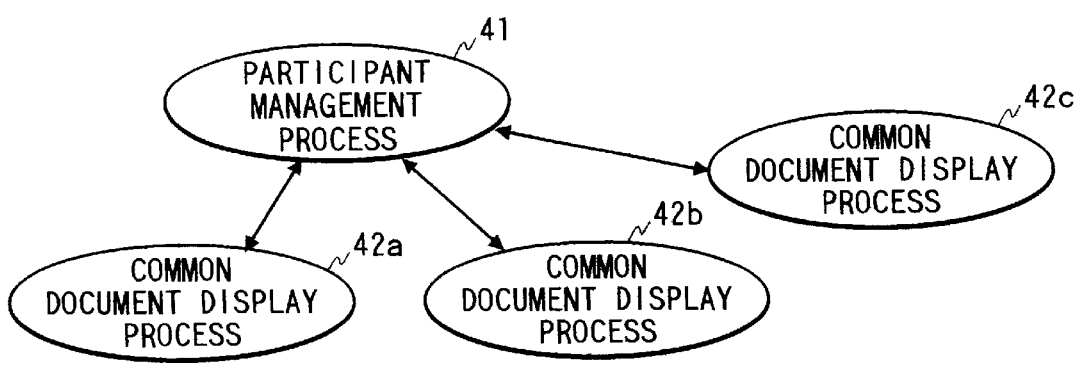
FIG. 4 is a diagram showing a process structure of the common document display apparatus according to the embodiment of the present invention.

FIG. 4 shows an example of a process structure according to the embodiment of the present invention. In FIG. 4, a participant management process 41 manages information on users attaining the conference and information concerning the documents to be shared in the conference. The participant management process 41 also supplies the management information to respective common document display processes 42a, 42b and 42c.

The participant management process 41 is operated by the CPU 21 according to a program stored in the RAM 22. In the embodiment, the participant management process 41 is operated by the first computer 31 (WS0).

The common document display processes 42a, 42b and 42c each provide a user interface for reading the documents, selecting a document to be displayed and taking a memo in the document, to display the document and a state of other participant by user input or on receipt of information from the participant management process 41.

The common document display processes 42a, 42b and 42c are each operated by the CPU 21 according to a program stored in the RAM 22. In the embodiment, these processes 42a, 42b and 42c are operated by the second to fourth computers 32 (WS1), 33 (WS2) and 34 (WS3), respectively. Hereinbelow, these processes 42a, 42b and 42c are simply referred to as the common document display process 42 unless it is required to specify any one of the process 42.

Each conference document is stored in the hard disk 25 by the file per page and distributed to each participant by reading a required file of the conference document from the hard disk 25. The distributed document and GUI components are displayed on the display 24 so that the user can input with the mouse 23 by clicking or dragging a necessary GUI component on the display 24.

The participant management process 41 and the common document display process 42 exchange information with each other through the network I/F 26 and the network 20. In exchanging information, any kind of network or network protocol may be used. It should be noted that the participant management process 41 is operated by one computer in each conference, and the common document display processes 42a, 42b and 42c are operated by each computer of all the participants, i.e., the common document display process 42 needs to be provided for each participant.

FIGS. 5A to 5D show an example of display realized by the common document display process 42. This example assumes that the user USER 1 operates the process 42 using the second computer 32 (WS1).

Figure 5A:
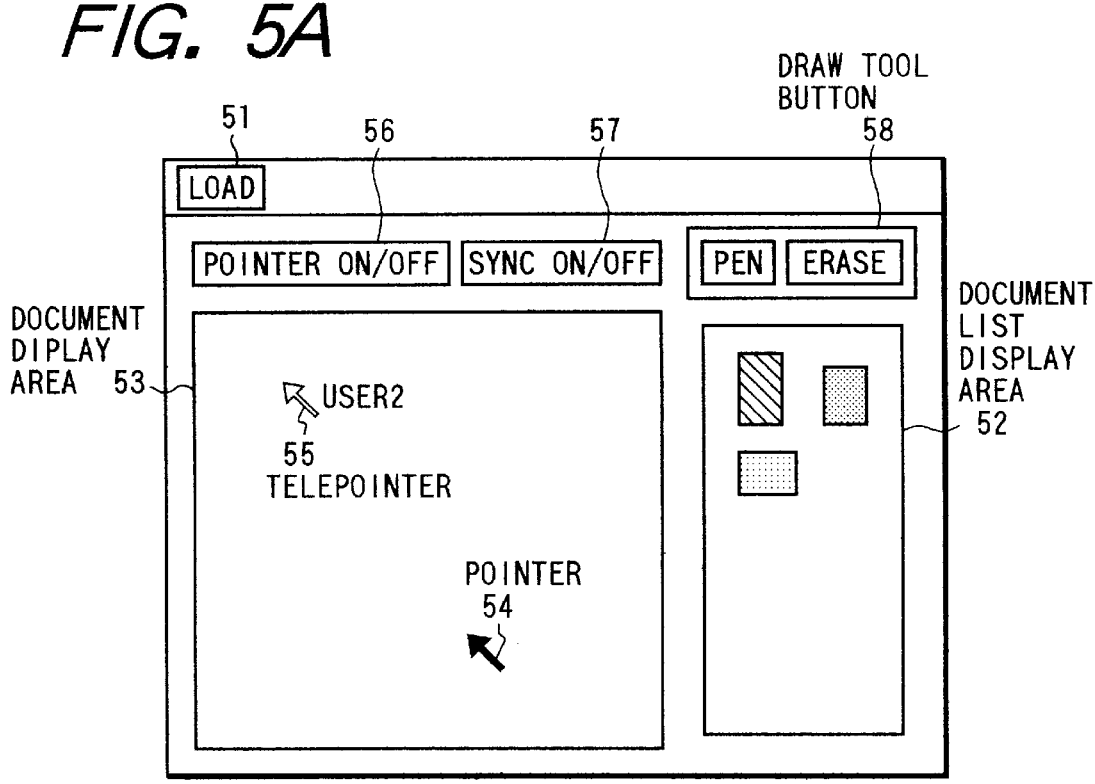
FIGS. 5A to 5D are diagrams each showing an example of an image plane displayed by a common document display process in a first embodiment of the present invention.
Figure 5B:
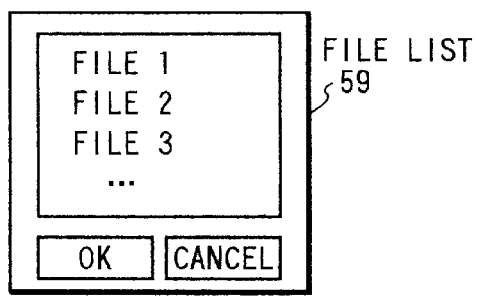

FIG. 5A shows a basic image plane. In FIG. 5A, a Load button 51 is a GUI component for reading a conference document from the hard disk 25 and distributing the conference document to the other participants. When clicking the Load button 51 with the mouse 23, a file selection window is popped up on the display 24 as shown in FIG. 5B, so that the conference document can be read and distributed to the other participants by selecting any file from a file selection list 59 within the window.

The list of the document read and distributed as such above is displayed by the file as icons to a document list display area 52 within the basic image plane as shown in FIG. 5A. Each participant can select any one of icons with the mouse 23 to display the document of the selected file to a document display area 53.

In the embodiment, a drag-and-drop method is used for selecting any one of document files, in which an icon is dragged from the document list display area 52 and dropped in the document display area 53 (including document display areas of sub image planes described later in a second embodiment). Alternatively, a double clicking may be used for selecting a file of document, in which an icon in the document list display area 52 is double clicked, since the present invention is not limited by the selection method.

In the embodiment, since the document is image data, the document icons in the document list display area 52 and the contents of the selected document to be displayed to the document display area 53 are processed as image data. It is therefore considered using any of image formats such as JPEG (Joint Photographic Coding Experts Group), PPM (Portable Pixmap) and GIF (Graphics Interchange Format), but the present invention is not limited by the kind of image format.

Further, each user can operate a Draw Tool button 58 to draw something along the motion of a pointer 54 in the document display area 53.

Figure 5C:
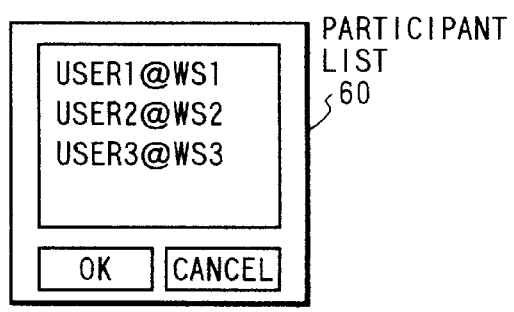
Figure 5D:
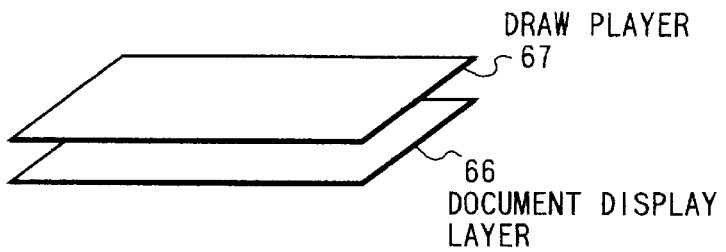

The document display area 53 is constituted by overlapping two layers, i.e., by overlaying a draw layer 67 on a document display layer 66 as shown in FIG. 5D. The document to be displayed to the document display area 53 is placed on the document display layer 66, while the drawing to be added to the document display area 53 is placed on the draw layer 67.

In this case, the contents of the drawing to be made on the draw layer 67 is preserved by only the common document display process 42 in one computer of each participant, and never shared by the other participants in the conference. Accordingly, each participant can freely take a personal memo in the document currently displayed in the conference.

Returning to FIG. 5A, a Sync ON/OFF button 57 is a GUI component for switching over between whether the same document as other participant is looking at should be displayed to my document display area 53 or not. The user can click the Sync ON/OFF button 57 to pop up a participant list window as shown in FIG. 5C. In the participant list window, all the participant names in the conference are listed and displayed as a participant list 60.

When the user selects any one of names from the participant list 60, the same page as the selected participant is looking at is displayed to his or her document display area 53. If the selected remote participant changes the page, then the page currently displayed in my document display area 53 is changed as well. In other words, the same page as the selected remote participant is looking at is displayed to my document display area 53 at all times. This state is called a sync state. In the sync state, if the Sync ON/OFF button 57 is clicked, the state returns to the original state, i.e., it returns to an asynchronous state.

Further, a Pointer ON/OFF button 56 is a GUI component for switching over, by click operation, between whether or not a pointer should be displayed to the document display area 53 preserved by the common document display process 42 in the computer of other participant, in the same position as the pointer 54 is located in my document display area 53.

FIG. 5A shows a state that the user USER2 operates the common document display process 42b using the third computer 33 (WS2) and clicks the Pointer ON/OFF button 56 so that a telepointer 55 corresponding to the pointer of the USER2 will be displayed to the document display area 53 of the common document display process 42a operated by the user USER1.

In this case, the telepointer 55 of the USER2 is displayed to the document display area 53 of the USER1.

The corresponding user name (USER2 in FIG. 5A) is displayed together with the telepointer 55. For this reason, each participant can find a position at which other specific participant is pointing out in the document currently shared among all the participants. This allows the document distributor to point out a specific page and a specific point of the document to the other participants for explaining the document so that each participant can refer to the document according to the explanation.

When the Pointer ON/OFF button 56 is clicked again, the telepointer 55 is cleared from the document display areas 53 of the other participants.

In order to operate the common document display process 42 as discussed above, the common document display processes 42a, 42b and 42c must share at least the following information; document file name, document page number, and pointer position. The information can be shared by establishing communications among the common document display processes 42a, 42b and 42c through the participant management process 41.

FIGS. 6A to 6E show exemplary formats of messages exchanged between the participant management process 41 and the common document display process 42. As shown in FIGS. 6A to 6E, massage names are attached to all messages 61 to 65 at the beginning thereof. That is, the messages 61 to 65 are named IMAGE_DISTRIBUTE, PAGE_CHANGE, POINTER_MOTION, POINTER_UNVISIBLE and POINTER_VISIBLE, respectively.

Further, numbers for identifying the kind of message are stored in respective first fields 61a, 62a, 63a, 64a, and 65a of the messages, such as 1, 2, 3, 4 and 5.

The message 61 of FIG. 6A is a message to be transmitted when any file of the document is selected from the file selection list 59 and the selected file of the document is read and distributed. The message 61 is transmitted to all the participants when distributing the document to the participants. On receipt of the message 61, each computer must make ready to receive the document to be distributed.

The message 61 stores a page number in a second field 61b thereof. Since the page number is determined by a page counter of the participant management process 41 as described later, the field 61b is blank at the time of transmitting the message 61 to the participant management process 41, and the blank is filled with the page number when transferring the message 61 from the participant management process 41 to the common document display process 42 of each participant. The message 61 also stores a file name of the document image data in a third field 61c thereof.

The message 62 of FIG. 6B is a message to be transmitted to all the participants when one of the participants drags a document icon from the document list display area 52 and drops it in the document display area 53 so that a corresponding page of the document can be displayed, i.e., when the page of the document to be referred is changed. The message 62 stores a user name and a computer name in a second field 62b and a page number indicative of a changed page in a third field 62c.

The message 63 of FIG. 6C is a message to be transmitted to all the participants when one of the participants moves the pointer 54 of FIG. 5A to other position in the document display area 53 of the common document process 42. The message 63 stores a user name and a computer name in a second field 63b, an x-coordinate of the pointer 54 in a third field 63c, and a y-coordinate of the pointer 54 in a fourth field 63d, respectively. In the telepointer display mode, the telepointer is displayed based on the coordinates stored in the message 63.

The message 64 of FIG. 6D is a message to be transmitted to all the participants when the indication of the telepointer 55 turns to be on-state by clicking the Pointer ON/OFF button 56 of the common document display process 42 shown in FIG. 5A, i.e., by switching over from the telepointer non-display mode to the telepointer display mode. On receipt of the message 64, each computer acts to display the telepointer.

The message 65 of FIG. 6E is a message to be transmitted to all the participants when the indication of the telepointer 55 turns to be off-state by clicking the Pointer ON/OFF button 56, i.e., by switching over from the telepointer display mode to the telepointer non-display mode. On receipt of the message 65, each computer acts not to display the telepointer. The messages 64, 65 each store a user name and a computer name in a second field 64b, 65b.

Referring next to the drawings, a further detailed description will be made to the participant management process 41 of FIG. 4.

FIG. 7 shows an example of information to be preserved by the participant management process 41. As shown in FIG. 7, the participant management process 41 preserves and manages respective information in a participant management list 70 and a page counter 73.

The participant management list 70 consists of a member entry 71 and an address entry 72. The page counter 73 gives consistency in page number of the document among the common document display processes 42, i.e., the page counter 73 gives a serial number to each page of the document. The member entry 71 stores a user name and a computer name assigned to each participant, and the address entry 72 stores an address on the network 20, which is used to access the computer and the common document display process 42 of each participant.

Although respective IP addresses and port numbers according to the UNIX are shown in FIG. 7, other information may be used herein as long as the information can specify a connection port between the common document display process 42 and the network 20.

Figure 8:
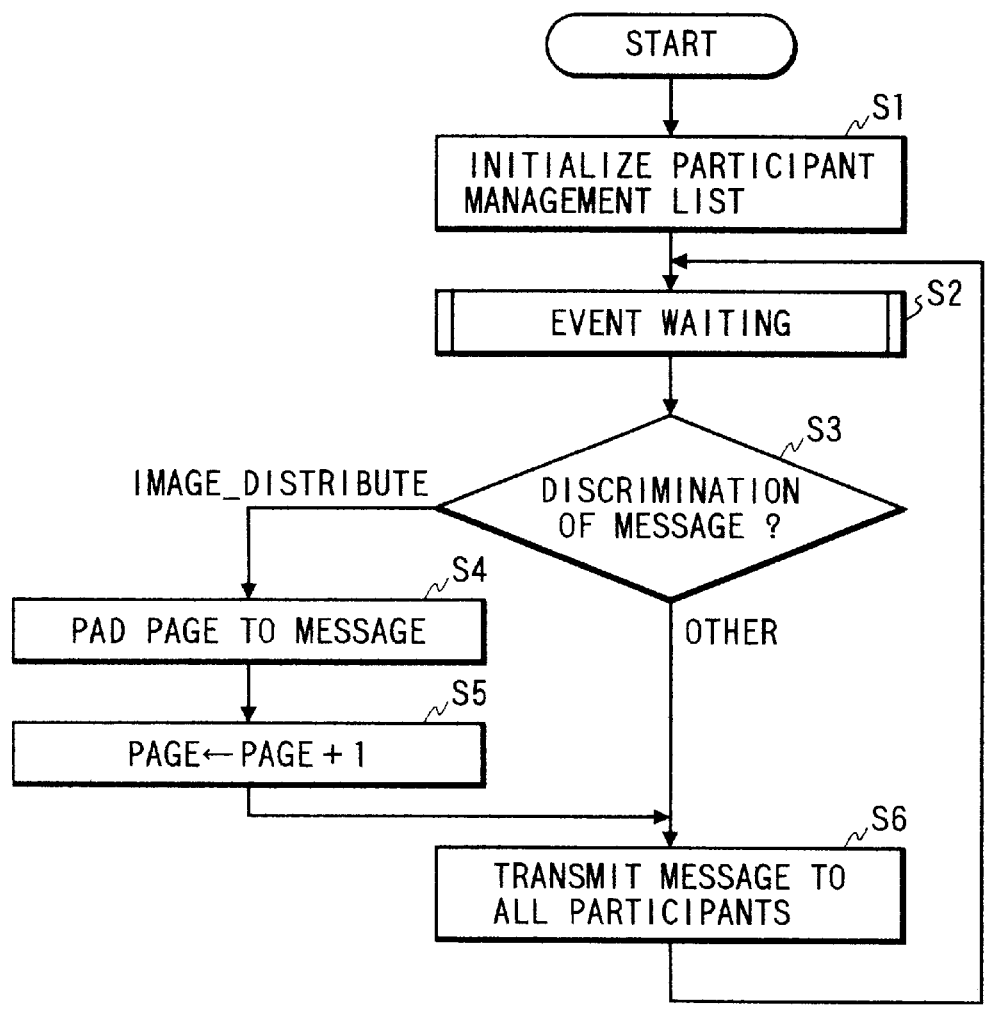
FIG. 8 is a flowchart showing operation of the participant management process in the first to third embodiments of the present invention.

FIG. 8 is a flowchart showing exemplary operation of the participant management process 41. Referring to FIG. 8, the operation of the participant management process 41 will be described below.

At step S1, the participant management list 70 is first initialized. In the embodiment, three entry data, USER1@WS1, USER2@WS2 and USER3@WS3, are entered in the member entry 71, and addresses corresponding to the three entry data are entered in the address entry 72, as shown in FIG. 7. Then, the page counter 73 is reset to "0".

After end operation of such initialization, the operation becomes event waiting state at step S2. When receiving a message from any common document display process 42, it exits the event waiting state and the received message is discriminated at step S3. If the name of the message is IMAGE_DISTRIBUTE, it goes to step S4.

At step S4, a blank portion in the received message (second field 61b in FIG. 6A) is filled with a value set by the page counter 73, and the value of the page counter 73 is incremented at the next step S5. This is how the one-to-one correspondence is found between a sheet of document and a page number.

At the subsequent step S6, a message is transmitted to the common document display process 42 operated by each participant, and the procedure returns to step S2.

If determination was made at step S3 that the received message has a name other than IMAGE_DISTRIBUTE, the procedure jumps to step S6, and the received message is transmitted as it is to the common document display process 42 of each participant. After that, the procedure returns to step S2.

Next, a description will be made in detail to the common document display process 42.

FIGS. 9A and 9B show an example of information preserved by the common document display process 42. The information to be preserved by the common document display process 42 contains a participant information list 90 of FIG. 9A and a document information list 96 of FIG. 9B. The lists shown in FIGS. 9A and 9B are provided for the common document display process 42b operated by the second computer 32 (WS1).

The participant information list 90 of FIG. 9A consists of a member entry 91 for storing a user name and a computer name of each participant, a page entry 92 for storing a page number of the document which is being looked by each participant, a position entry 93 for storing coordinates of the pointer 54 located in the document display area 53 of each participant, a telepointer entry 94 for indicating visible/invisible of the telepointer 55 of other participant with true/false, and a synchronism entry 95 for indicating, by entering yes/no, whether or not the participants should synchronize the displayed page with each other.

The telepointer entry 94 has no value in the entry column corresponding to its own computer. The synchronism entry 95 has "yes" only in one entry column corresponding to one of computers, and no value in the entry column corresponding to its own computer.

The document information list 96 of FIG. 9B preserves information concerning the document commonly referred by all the participants, and consists of a page entry 97 for storing each page number of the document and an image file entry 98 for storing each file number of the document. Since the page numbers in the page entry 97 is determined by the participant management process 41, the page entry 97 is filled with each value (number) contained in the message received from the participant management process 41.

FIGS. 10 to 21 are flowchart showing operation of the common document display process 42. Referring to FIGS. 10 to 21, the operation of the common document display process 42 will be described below.

Figure 10:
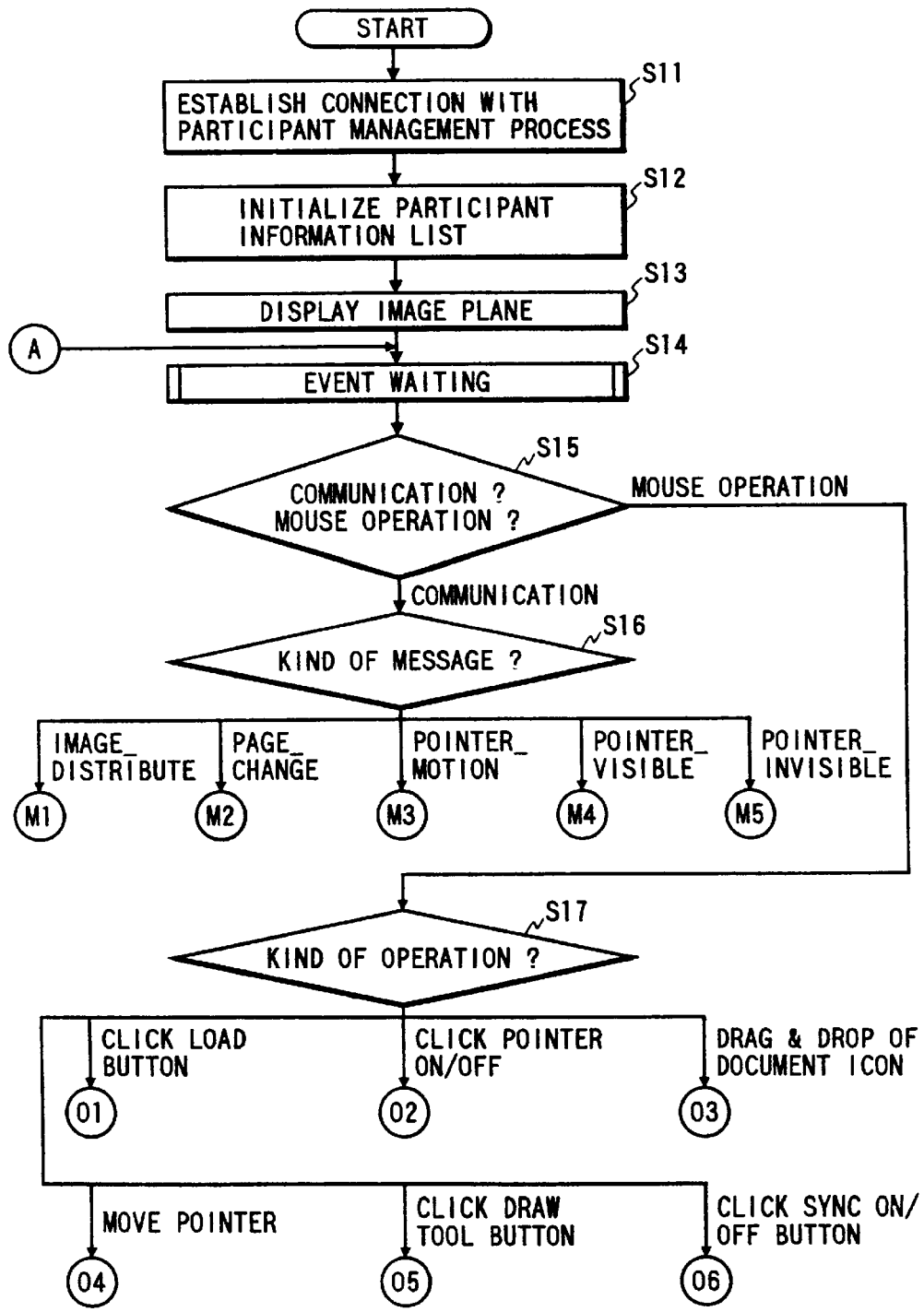
FIG. 10 is a flowchart showing main operation of the common document display process in the first embodiment of the present invention.

In FIG. 10, the participant information list 90 shown in FIG. 9A is first initialized by establishing communication with the participant management process 41 at step S11 and storing information concerning the conference in the respective entries 91 to 95 of the participant information list 90 at step S12. The basic image plane shown in FIG. 5A is then displayed at step S13, and the operation becomes event waiting state at step S14.

The operation procedure exits step S14 and goes to the next processing step in case either of the following two opportunities arises:

(1) mouse operation produces an event on the basic image plane displayed by the common document display process 42, or (2) the common document display process 42 receives a message transmitted from the participant management process 41. At step S15, it is determined which opportunity arises, and if it is (1), the procedure goes to step S17. If it is (2), it goes to step S16.

At step S16, the subsequent processing branches according to the kind of received message as follows: when the received message is IMAGE_DISTRIBUTE, it goes to M1; when it is PAGE_CHANGE, it goes to M2; when it is POINTER_MOTION, it goes to M3; when it is POINTER_VISIBLE, it goes to M4; and when it is POINTER_UNVISIBLE, it goes to M5.

At step S17, the subsequent processing branches according to the kind of produced event as follows: when clicking the Load button 51, it goes to O1; when clicking the Pointer ON/OFF button 56, it goes to O2; when dragging and dropping a document icon, it goes to O3; when moving the pointer 54 to other position in the document display area 53, it goes to O4; when clicking the Draw Tool button 58, it goes to O5; and when clicking the Sync ON/OFF button 57, it goes to O6.

Hereinbelow, each branch of the subsequent processings will be described.

Figure 11:
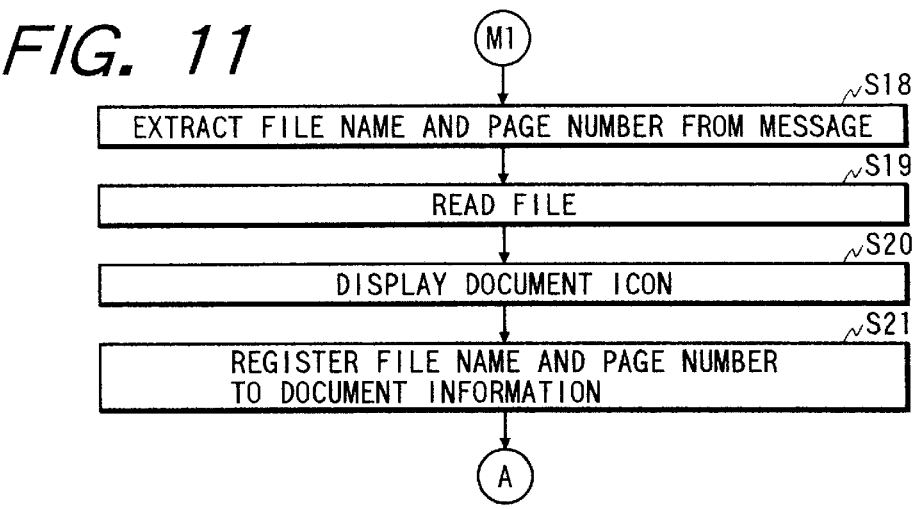
FIG. 11 is a flowchart showing operation of the common document display process in the first to third embodiments of the present invention.

When the step S16 branches to M1 in FIG. 10, the procedure goes to step S18 in FIG. 11, and a file name of the document and a page number added by the participant management process 41 are first extracted from the received message.

Then, a file corresponding to the extracted file name is read at step S19. The file of the document to be read herein is transferred from a computer used by a remote participant who distributed the document, and copied to my hard disk 25, as described later. The read file of the document is displayed as a document icon to the document list display area 52 at step S20. At the subsequent step S21, the extracted file name and page number are registered to the document information list 96 of FIG. 9B, and the procedure returns to step S14 in FIG. 10.

Figure 12:
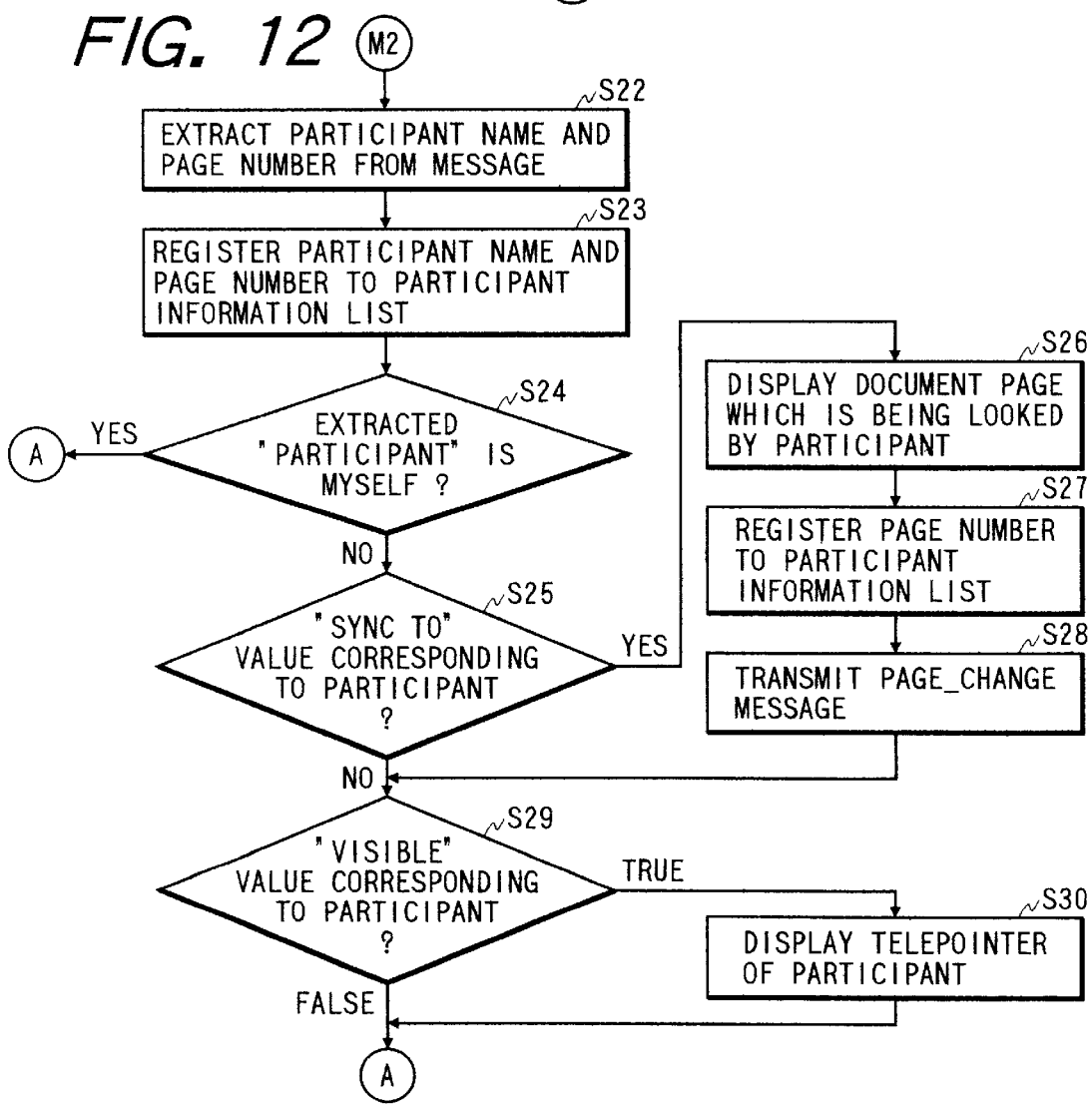
FIG. 12 is a flowchart showing operation of the common document display process in the first embodiment of the present invention.

When the step S16 branches to M2 in FIG. 10, the procedure goes to step S22 in FIG. 12, and a participant name and a page number are extracted from the received message. The extracted participant name and page number are registered to the participant information list 90 of FIG. 6A at step S23.

At the subsequent step S24, it is checked whether the participant name contained in the message transmitted from the participant management process 41 is mine or not, and if mine, the procedure returns to step S14 in FIG. 10. If not mine, the procedure goes to step S25, and the synchronism entry 95 is searched for a "Syncto" value corresponding to the extracted participant name. If the value is "yes", the procedure goes to step S26.

At step S26, the same page (extracted page) as the extracted participant is looking at is displayed to the document display area 53. Since the page being looked by myself is changed, the new page number is registered to the participant information list 90 at step S27, and a message "PAGE_CHANGE" is transmitted at step S28.

After end operation of transmitting the message at step S28, or when determination was made at step S25 that the value of the synchronism entry 95 is "no", the procedure goes to step S29. At step S29, the telepointer entry 94 is searched for a value corresponding to the participant name extracted from the received message, and if the value is "true", it goes to step S30. Then, the telepointer 55 of the participant with the name contained in the received message is displayed at step S30, and the procedure returns to step S14 in FIG. 10. If the value of the telepointer entry 94 is "false", the procedure returns to step S14 without displaying the telepointer 55.

Figure 13:
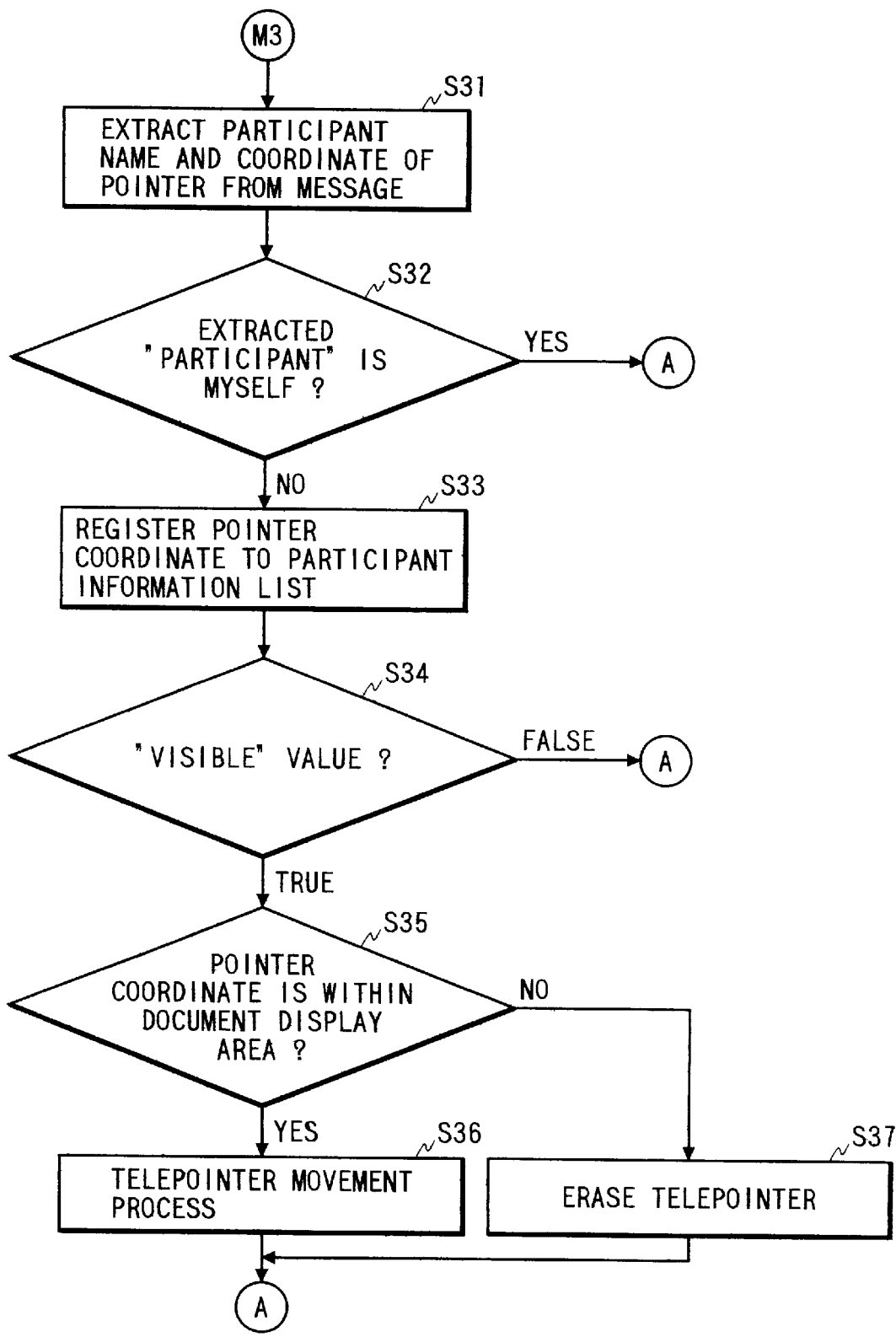
FIG. 13 is a flowchart showing operation of the common document display process in the first to third embodiments of the present invention.

When the step S16 branches to M3 in FIG. 10, the procedure goes to step S13 in FIG. 13, and a participant name and coordinates of a pointer 54 are extracted from the received message. At the subsequent step S32, it is checked whether the participant name contained in the received message is mine or not, and if mine, the procedure returns to step S14 in FIG. 10.

If not mine, since the extracted coordinates of the pointer 54 are coordinates of a pointer which is being displayed on the basic image plane of other participant, the procedure goes to step S33, and the extracted pointer coordinates are registered to the participant information list 90 of FIG. 9A. At the subsequent step S34, the telepointer entry 94 is searched for a value corresponding to the extracted participant, and if the value is "false", the procedure returns to step S14 in FIG. 10.

If the value of the telepointer entry 94 is "true", since the extracted pointer coordinates are coordinates of the telepointer 55 which should be displayed on my basic image plane, the procedure goes to step S35, and it is checked whether or not the coordinates of the telepointer 55 are within the document display area 53. If the coordinates of the telepointer 55 are within the document display area 53, the procedure goes to step S36, and the telepointer 55 is moved to the position in the coordinates. If not within the document display area 53, the telepointer 55 is erased at step S37.

When the step S16 branches to M4 in FIG. 10, the procedure goes to step S38 in FIG. 14, and a participant name is extracted from the received message. At the subsequent step S39, it is checked whether the extracted participant is myself or not, and if myself, the procedure returns to step S14 in FIG. 10. If not myself, the procedure goes to step S40, and a value "true" is registered to the telepointer entry 94 of the participant information list 90, i.e., "visible=true" is registered to the participant information list 90. After that, the telepointer 55 is displayed at step S41, and the procedure returns to step S14 in FIG. 10.

When the step S16 branches to M5 in FIG. 10, the procedure goes to step S42 in FIG. 15, and a participant name is extracted from the received message. At the subsequent step S43, it is checked whether the extracted participant is myself or not, and if myself, the procedure returns to step S14 in FIG. 10. If not myself, the procedure goes to step S44, and a value "false" is registered to the telepointer entry 94 of the participant information list 90, i.e., "visible=false" is registered to the participant information list 90. After that, the telepointer 55 is erased at step S45, and the procedure returns to step S14 in FIG. 10.

Next, descriptions will be made in turn to each operation at the time when an even occurs on the basic image plane of FIG. 5A due to mouse operation.

Figure 16:
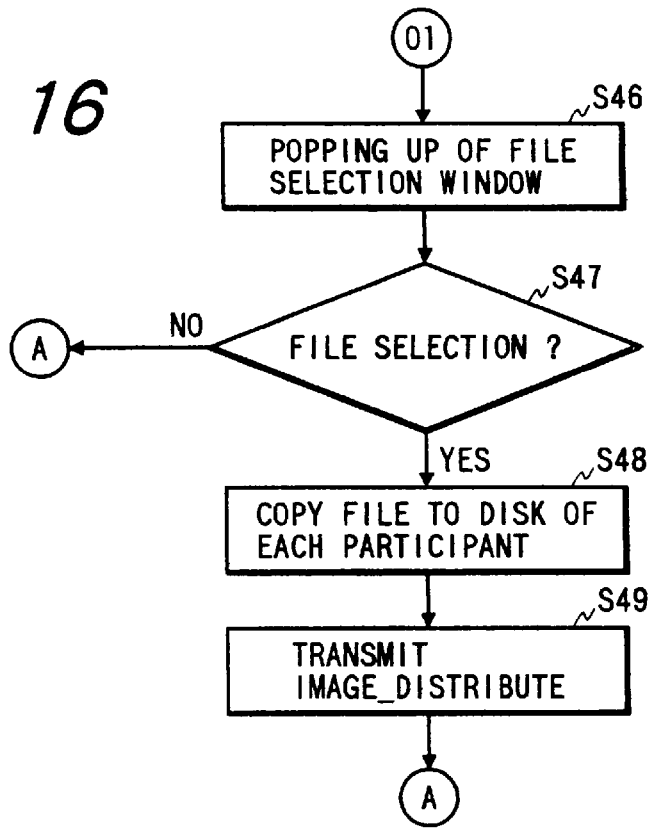
FIG. 16 is a flowchart showing operation of the common document display process in the first to third embodiments of the present invention.

When the step S17 branches to O1 in FIG. 10, the procedure goes to step S46 in FIG. 16, and the file selection window is popped up as shown in FIG. 5B.

At the subsequent step S47, it is determined whether a file is selected from the file selection list 59 displayed in the file selection window, and a name of the selected file is checked. If the file name is blank, the procedure returns to step S14 in FIG. 10. If the file name is found, it goes to step S48. In the embodiment, although the file selection is made by clicking a file name in the file selection list 59 and an OK button, the present invention is not limited thereto.

The selected file is then copied at step S48 to the remote hard disk 25 connected through the network 20 and used by each participant. Although it is considered that some methods can be used for taking the copy, such as a ftp command and an rcp command according to the UNIX, any other methods may be used as long as they can copy the selected file to the remote hard disk 25. After that, a message IMAGE_DISTRIBUTE is transmitted at step S49, and the procedure returns to step S14 in FIG. 10.

Figure 17:
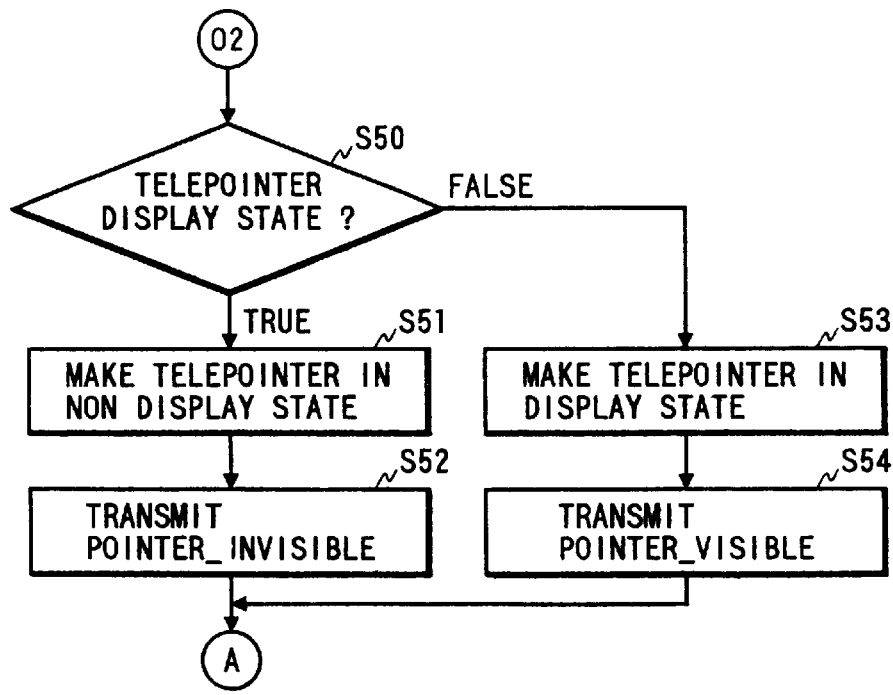
FIG. 17 is a flowchart showing operation of the common document display process in the first to third embodiments of the present invention.

When the step S17 branches to O2 in FIG. 10, the procedure goes to step S50 in FIG. 17, and, since the Pointer ON/OFF button 56 is a toggle switch, the current state of the Pointer ON/OFF button is checked. As a result of the check, if the telepointer 55 is being displayed at the moment, the telepointer 55 is changed to the non-display state at step S51, and a message POINTER_UNVISIBLE is transmitted at step S52.

If the telepointer 55 is in the non-display state, the procedure shifts from step S50 to step S53. The telepointer 55 is changed to the display state at step S53, and a message POINTER_VISIBLE is transmitted at step S54. After that, the procedure returns to step S14 in FIG. 10.

Figure 18:
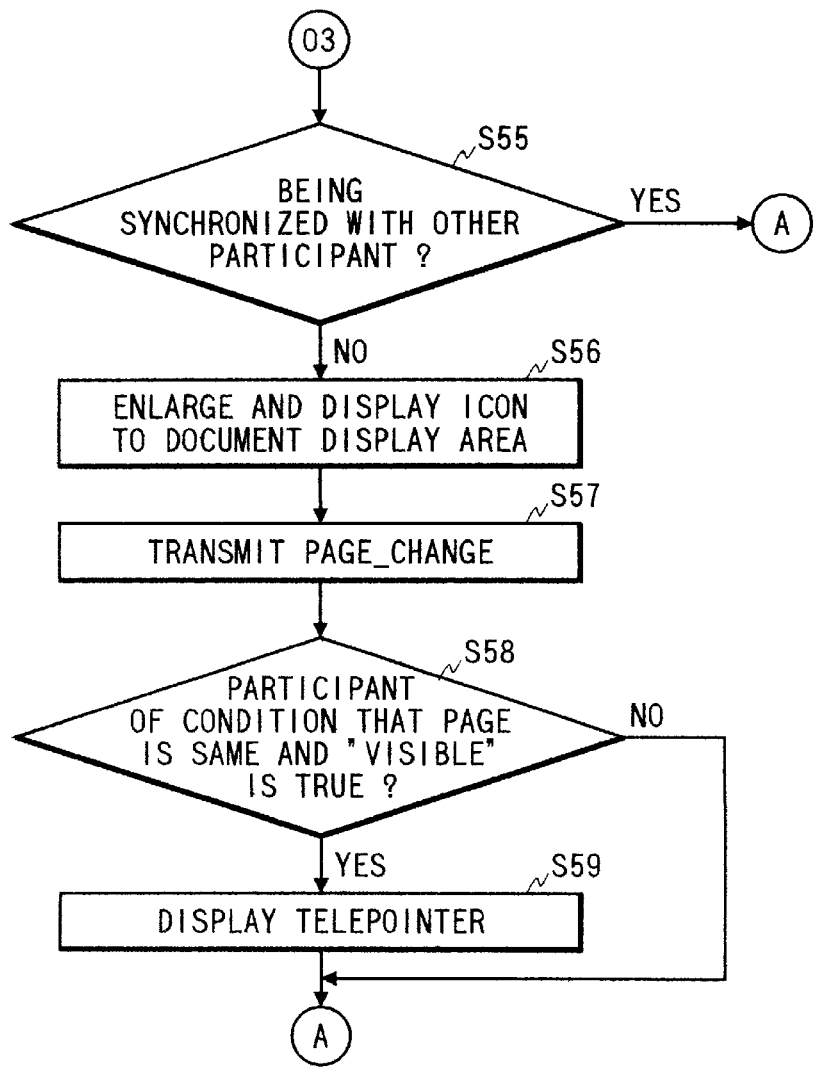
FIG. 18 is a flowchart showing operation of the common document display process in the first embodiment of the present invention.

When the step S17 branches to O3 in FIG. 10, the procedure goes to step S55 in FIG. 18, and it is checked on the synchronism entry 95 in the participant information list 90 of FIG. 9A whether the currently displayed document is being synchronized with the document which is being displayed by other participant, i.e., my display should be synchronized with that of other participant. If it is being synchronized, the display is regarded as being prohibited from selecting any page by myself, the procedure returns to step S14 in FIG. 10.

If it is not being synchronized with that of other participant, the procedure goes to step S56. The document corresponding to a document icon of the selected file is enlarged and displayed to the document display area 53 at step S56, and a message PAGE_CHANGE is transmitted at step S57. After that, the participant information list 90 of FIG. 9A is searched at step S58 for a participant that the value of the page entry 97 is the same and the value of the telepointer entry 94 is "true". If such a participant exists, the telepointer 55 is displayed at step S59, and the procedure returns to step S14 in FIG. 10.

Figure 19:
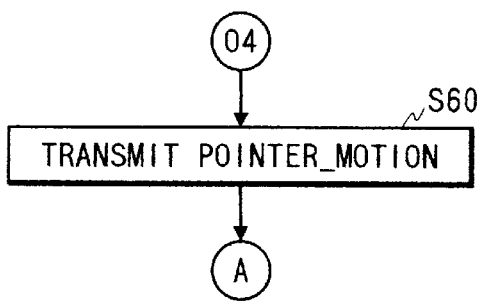
FIG. 19 is a flowchart showing operation of the common document display process in the first to third embodiments of the present invention.
Figure 20:
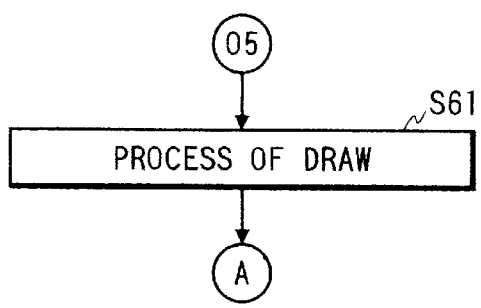
FIG. 20 is a flowchart showing operation of the common document display process in the first to third embodiments of the present invention.

When the step S17 branches to O4 in FIG. 10, the procedure goes to step S60 in FIG. 19. At the step, a message POINTER_MOTION is transmitted, and it returns to step S14 in FIG. 10. Meanwhile, when the step S17 branches to O5 in FIG. 10, a draw process is initiated at step S61 in FIG. 20. In the draw process, several drawing methods can be used, but the description is omitted here. Although the draw process should have been described in case of the branch to O3, the description was also omitted for the purpose of simplification.

Finally, when the step S17 branches to O6 in FIG. 10, the procedure goes to step S62 in FIG. 21, and the participant list window of FIG. 5C is popped up. Each participant selects any one of participants, with which the display should be synchronized, from the participant list 60 in the participant list window. At the subsequent step S63, the selected participant name is matched with that of the member entry 91 in the participant information list 90.

As a result of the matching process at step S63, the document of a page number contained in the page entry 92 and corresponding to the coincident participant is displayed to the document display area 53 at step S64. Consequently, since the page number which is being looked by myself is changed, the page number newly displayed is registered to the participant information list 90 at step S65, and a message PAGE_CHANGE is transmitted at step S66. After that, the procedure returns to step S14 in FIG. 10.

As described above, according to the first embodiment of the present invention, there are provided such functions as to distribute documents, switch the display from one document to another, discriminate between the draw layer and the document display layer, display the telepointer, and synchronize the document display. For this reason, each participant in the conference can refer to any of the plural documents freely and take a memo in the document, while the document distributor can point out a specific page and a specific point of the document to the participants for explaining the document, thus imitating an actual conference in the desktop conference.

However, since the common document display apparatus according to the first embodiment has only one window (document display area 53) for displaying conference document, plural pages of the conference document can not be displayed at the same time. In other words, the participants in the desktop conference can not imitate the actual conference where plural pages of the document usually fastened with a paper clip or by using a stapler are opened and referred at the same time by each participant. Further, in the document display synchronism mode, since the document to be displayed is changed forcedly by the participant who is synchronizing the display, the other participants can not see other document even if they desire to see the document.

To overcome such problems in the first embodiment, a second embodiment of the present invention is provided, and the description thereof will be given hereinbelow.

Figure 22A:
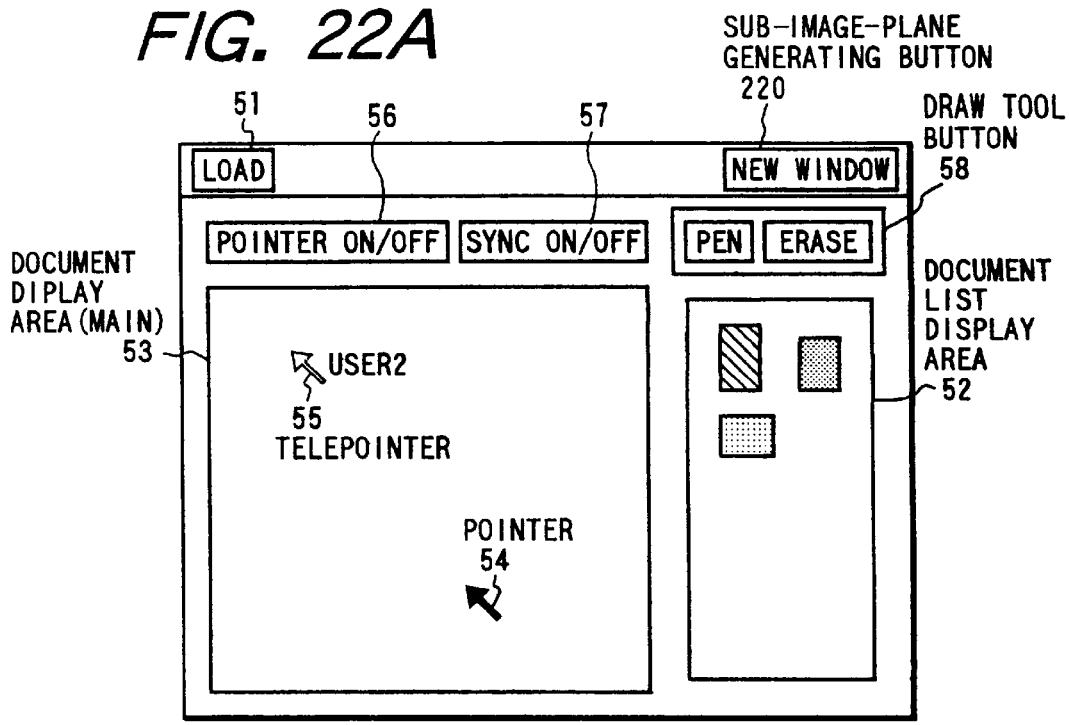
FIGS. 22A and 22B are diagrams each showing an example of an image plane displayed by the common document display process in the second and third embodiments of the present invention.
Figure 22B:
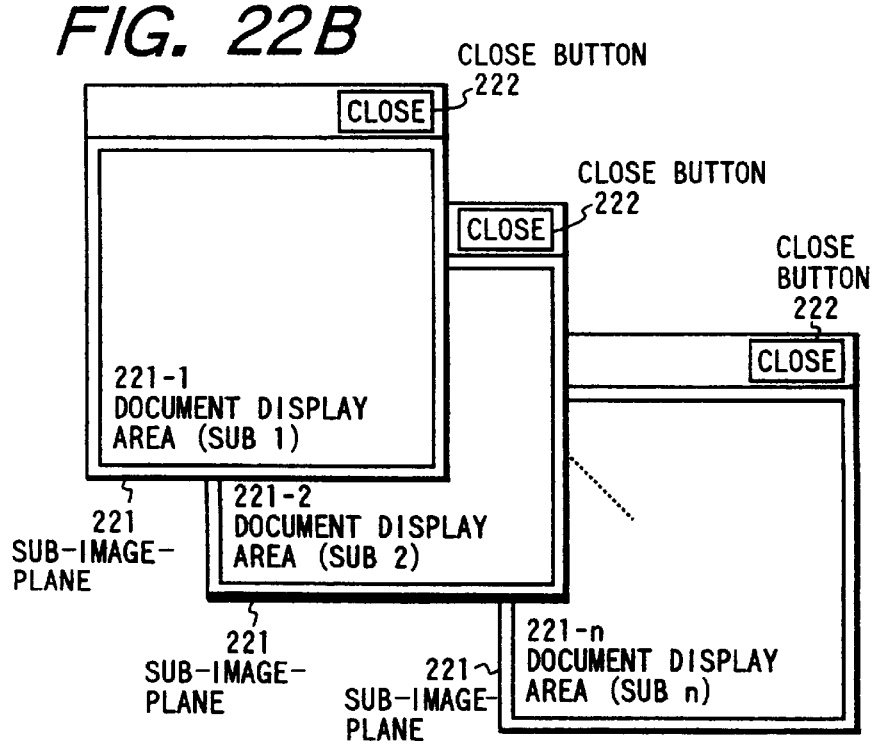

FIGS. 22A and 22B show an example of image planes displayed by a common document display process 42 according to the second embodiment of the present invention. The example assumes that the user indicated by USER1 in FIG. 3 operates the process 42 using the second computer 32 (WS1) in the same manner as in FIGS. 5A to 5D.

FIG. 22A shows a basic image plane. The basic image plane is different from that of FIG. 5A in that a sub image plane generating button 220 is newly provided. When clicking the sub image plane generating button 220, sub image planes 221 corresponding to the number of document papers (n pieces in the embodiment) are generated as shown in FIG. 22B. On each sub image plane 221, a close button 222 is provided for erasing its own sub image plane by clicking it.

The n pieces of sub image planes 221 include document display areas 221-1, 221-2, . . . , 221-n (hereinbelow, simply called the sub windows 1-n), respectively. Each of the sub windows 1-n has the document display layer 66 and the draw layer 67 as similar to the document display area 53 (hereinbelow, called the main window) on the basic image plane. In such a structure, each participant can display conference document to the document display layer 66 and draw something such as a memo to the draw layer 67.

In the embodiment, the operation for displaying the telepointer 55 in the document display synchronism mode is performed only to the main window 53, not to the sub windows 1-n of FIG. 22B. On the other hand, when selecting a document icon, if the currently displayed sub window is a sub window containing the same document as that of the selected icon, the currently displayed document is exchanged between the sub windows.

To ease the understanding of the correspondence between the documents displayed in the main window 53 and the sub windows 1-n, and the document icons in the document list display area 52, each document icon in the document list display area 52 is displayed with the same color as each frame of the corresponding main window 53 and sub windows 1-n. Other countermeasures may be used for easy understanding of the correspondence therebetween, such as to display the page number to an available space on the sub image plane 221.

Since such a structure can provide a plurality of display windows for displaying plural pages of the conference document, the common document display process 42 preserves a display area list 230, as shown in FIG. 23, in addition to the participant information list 90 of FIG. 9A and the document information list 96 of FIG. 9B. The display area list 230 contains information as to which page of the document is displayed to each of the plurality of display areas (the main window and the sub windows 1-n).

In the display area list 230, a display area ID entry 231 takes a value "0" or more as a display area is newly generated. On the other hand, when the display area is erased by clicking the close button 222, a negative value is stored in the display area ID entry 231 to prohibit the entry from being used. It should be noted that the display area ID of the main window 53 always takes a value "0" and the entry is never changed.

When displaying a document to the newly generated display area, the page number of the displayed document is stored in a display page entry 232. In the display page entry 232, a page value corresponding to the entry of the display area ID=0 (i.e., the entry of the main window 53) is equal to the value of the page entry 92 in the participant information list 90 of FIG. 9A.

The operation of the common document display process 42 according to the second embodiment of the present invention are shown in the following flowcharts.

Figure 24:
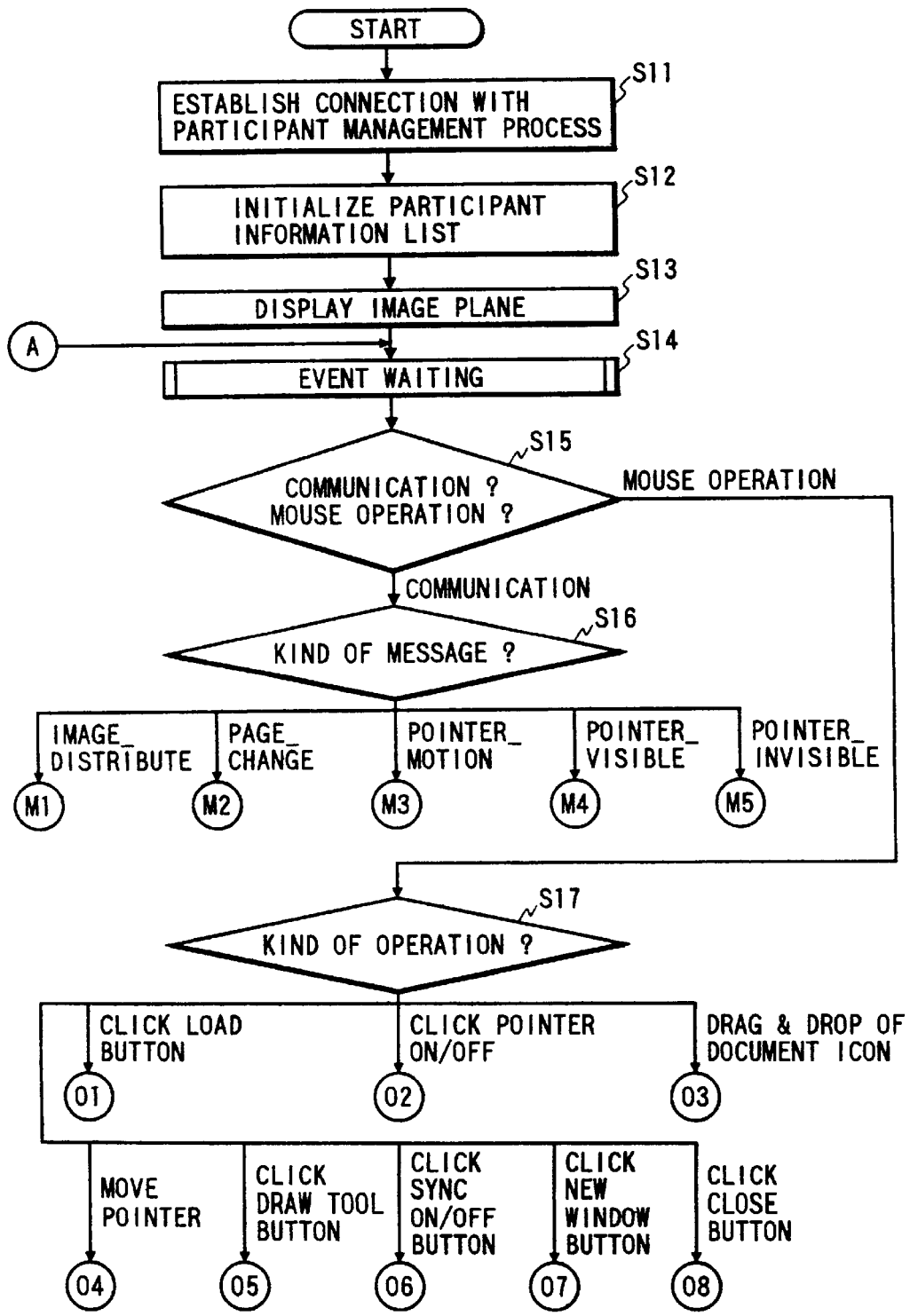
FIG. 24 is a flowchart showing main operation of the common document display process in the second and third embodiments of the present invention.

FIG. 24 is used instead of the main flow of the first embodiment in FIG. 10. Hereinbelow, descriptions will be made only to portions different from the first embodiment.

At step S15 in FIG. 24, it is determined which opportunity arises; mouse operation produces an event on either the basic image plane of FIG. 22A or the sub image plane 221 of FIG. 22B, or the common document display process 42 receives a message transmitted from the participant management process 41. If the former opportunity arises, the procedure goes to step S17. If it is the latter, the procedure goes to step S16.

When the procedure moves to step S17 due to an event occurrence by clicking of the mouse or the like, the subsequent processing branches to O7 and O8 according to the kind of event in addition to the branches in FIG. 10. In other words, it branches to O7 when the sub image plane generating button 220 is clicked, while it branches to O8 when the close button 222 is clicked.

In the branches M1 to M5 corresponding to respective kinds of received message and the branches O1 to O8 corresponding to respective kinds of event produced by clicking of the mouse or the like, as shown in FIG. 24, the processings other than those in the branches M2, O3, O7 and O8 are substantially the same as in the first embodiment. Accordingly, the detail descriptions of the same branches are omitted, and only the processings in the above four branches will be described in detail below.

Figure 25:
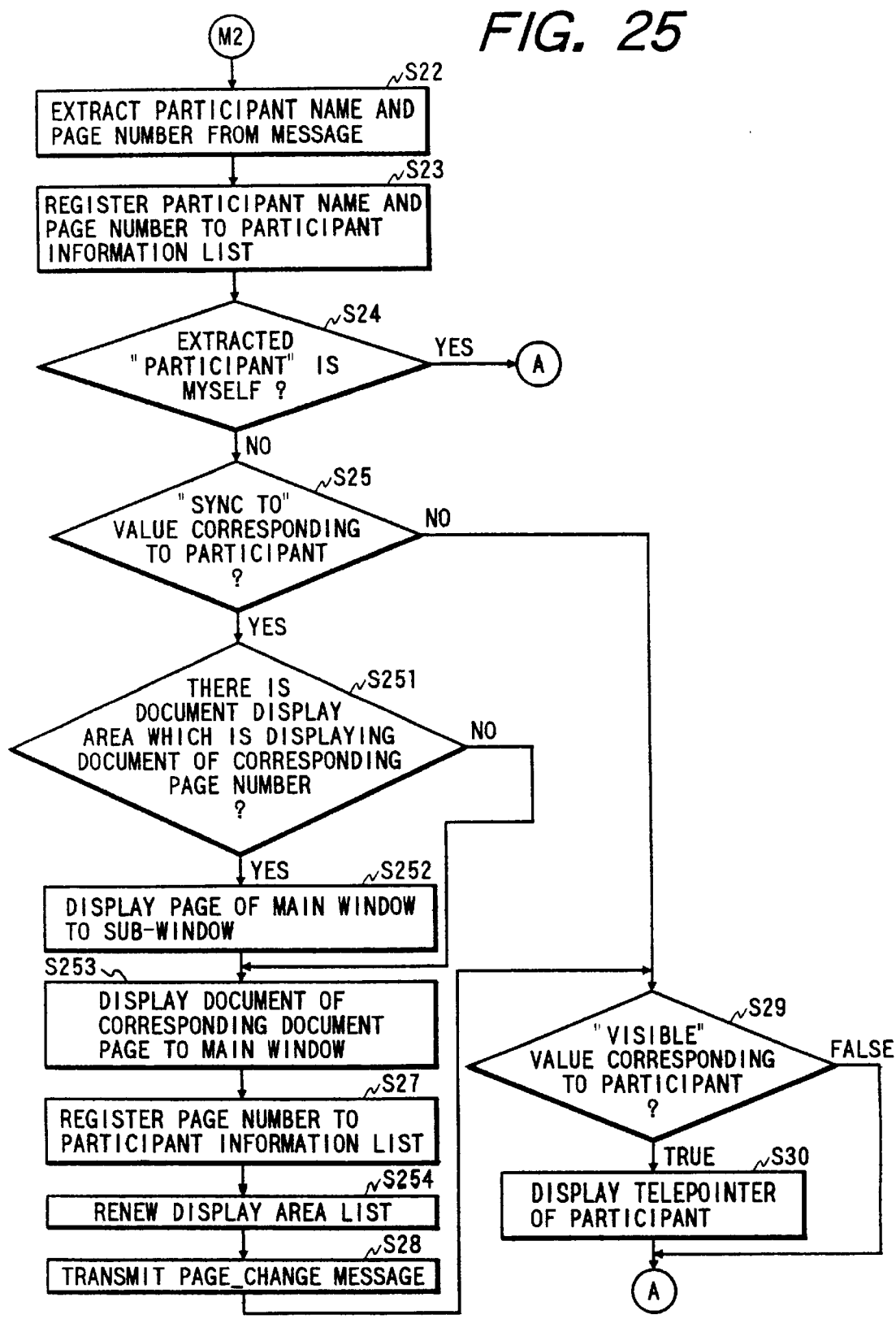
FIG. 25 is a flowchart showing operation of the common document display process in the second embodiment of the present invention.

FIG. 25 is a flowchart showing the processing to be performed when the step S16 branches to M2 in FIG. 24. In FIG. 25, processing steps identical to those in FIG. 12 are given the same step numbers.

At step S25, the synchronism entry 95 is searched for a "Syncto" value, and if the value is "yes", the procedure goes to step S251. At step S251, it is checked on the display area list 230 of FIG. 23 whether there is a document display area on any of the sub image planes 221, which is being displaying a document corresponding to the page number extracted from the received message.

If there is the document display area which is displaying the corresponding document, the procedure goes to step S252. At step S252, the document of the main window 53 is displayed to the document display area (any one of the sub windows 1-n) searched at the prior step S251, and it goes to step S253. If there is no sub window which is displaying the document corresponding to the extracted page number as a result of the search at the prior step S251, the procedure jumps to step S253.

At step S253, the document corresponding to the page number extracted from the received message is displayed to the main window 53 on the basic image plane. The page number is registered to the participant information list 90 at step S27, and the contents of the display page entry 232 in the display area list 230 is renewed at step S254. The renewal process is concretely carried out by exchanging the page value displayed on the main window for the page value displayed on the sub window searched at step S251. Since the page number of the document which is being looked by myself is changed, a message PAGE_CHANGE is transmitted at step S28.

In the embodiment, a branch condition at step S251 and processing steps subsequent to step S252 are provided not to display an identical document at a time to plural document display areas in the main window 53 and the sub windows 1-n. This allows the display windows to smoothly exchange the conference document with each other.

Figure 26:
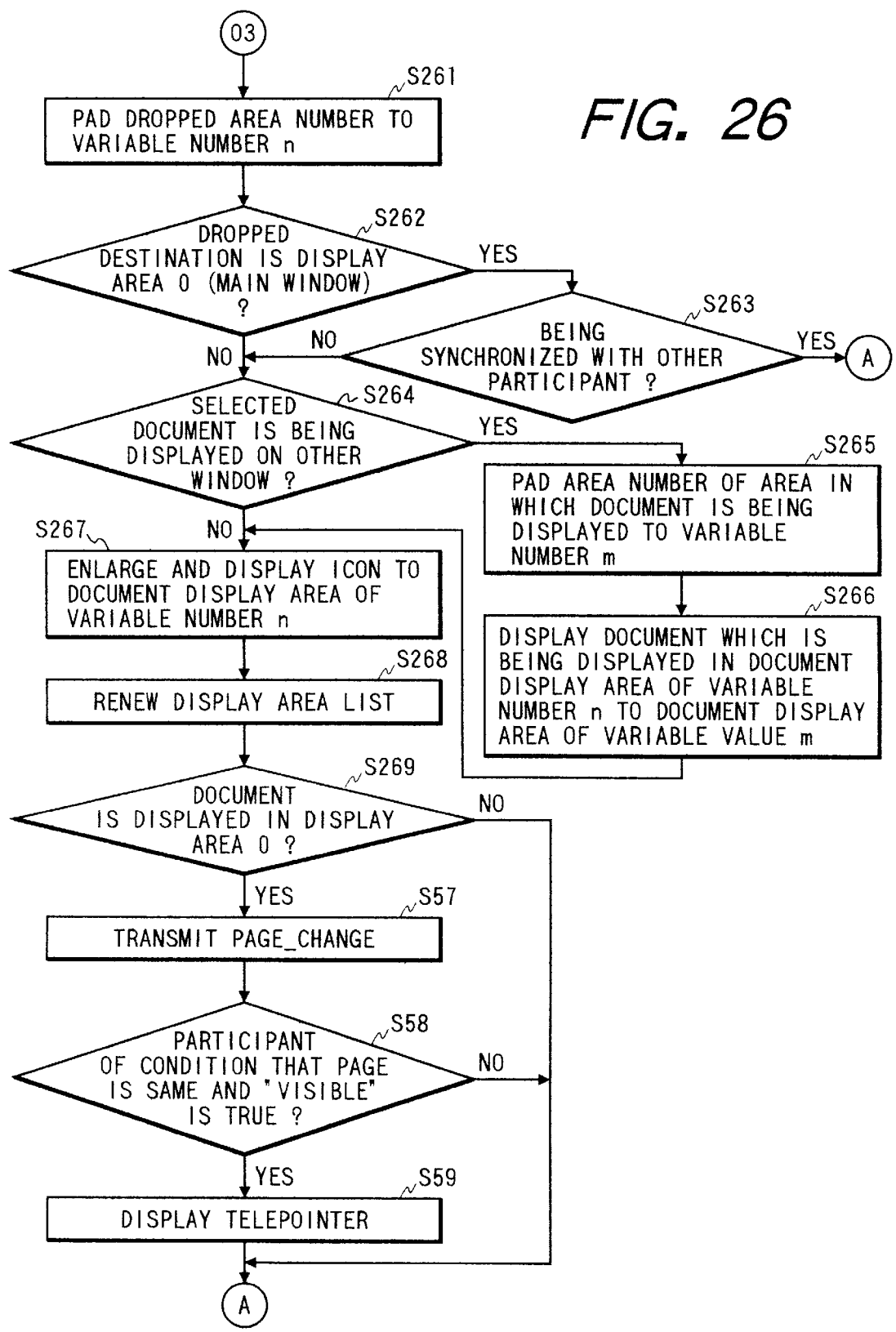
FIG. 26 is a flowchart showing operation of the common document display process in the second and third embodiments of the present invention.

FIG. 26 is a flowchart showing the processing to be performed when the step S17 branches to O3 in FIG. 24.

In FIG. 26, an ID number of the document display area to which a document icon was dropped by mouse operation is first padded to a variable number n at step S261. At the subsequent step S262, it is checked whether the variable number n is "0", i.e., whether the dropped destination is the main window 53. The checking process is provided because the main window 53 and the other sub windows 1-n have different functions in the embodiment.

If the dropped destination of the document icon is the main window 53, the procedure goes to step S263, and it is checked on the synchronism entry 95 whether the document display is being synchronized with other participant. If the display mode is in the document display synchronism mode, since the page to be displayed to the main window 53 can not be selected freely by myself, the procedure returns to step S14 in FIG. 24.

If determination was made at step S263 that the document display synchronism mode is not set herein, or determination was made at step S262 that the variable number n is not "0", the procedure goes to step S264. At step S264, it is checked on the synchronism entry 95 whether the document selected by drag-and-drop operation is being displayed in a document display area other than that of the dropped destination.

If the selected document is being displayed in other window, the ID number of the document display area in which the selected document is being displayed is padded to a variable number m at step S265. At the subsequent step S266, the document which is being displayed in the document display area of the variable number n is displayed to the document display area of the variable number m. The selected document is then displayed to the document display area of the variable number n at step S267. Since the document to be displayed is exchanged between two document display areas, an identical document is prevented from being displayed at a time to plural document display areas of the main window 53 and the sub windows 1-n.

If determination was made at step S264 that the selected document is not being displayed in any document display area, steps S265 and S266 are omitted, and only the display process to the document display area of the variable number n is performed at step S267. After that, the display area list 230 is renewed at step S268 in the same manner as step S254 in FIG. 25.

At the subsequent step S269, it is checked on the display area list 230 whether the document is displayed on the main window 53, and if not displayed on the main window 53, the procedure returns to step S14 in FIG. 24. If the document is displayed on the main window, it goes to step S57.

Then, a message PAGE_CHANGE is transmitted at step S57. After that, the participant information list 90 of FIG. 9A is searched at step S58 for a participant that the value of the page entry 97 is the same and the value of the telepointer entry 94 is "true". If such a participant exists, the telepointer 55 is displayed at step S59, and the procedure returns to step S14 in FIG. 24.

FIG. 27 is a flowchart showing the processing to be performed when the step S17 branches to O7 in FIG. 24.

In FIG. 27, sub image planes 221 of FIG. 22B are first generated and displayed at step S271. At this time, the sub windows 1-n of the respective sub image planes 221 are registered to the system as dropped destinations of document icons at the time of drag-and-drop operation.

At the subsequent step S272, display area IDs having negative values are detected from the display area list 230, and the detected display area IDs are incremented by one to the maximum value in the entry and registered to the display area list 230. After that, the procedure returns to step S14 in FIG. 24.

FIG. 28 is a flowchart showing the processing to be performed when the step S17 branches to O8 in FIG. 24.

In FIG. 28, the sub image plane is erased by clicking the close button 222 at step S281, and the display area list 230 is renewed at step S282. After end operation of renewing the display area list 230, the procedure returns to step S14 in FIG. 24.

The renewal process is performed as follows: a display area ID corresponding to the sub image plane to be erased is found and eliminated, and, after a blank is inserted in the display area ID entry 231, all values of the display area IDs larger than the erased display area ID are shifted to entry columns having a value smaller by one and the display area IDs is renumbered in order from "0". Accordingly, the display area list 230 is always sorted in order from the smallest number, and the display area IDs take numbers 0 to n.

As described above, according to the second embodiment, since plural pages of the conference document can be displayed at the same time to the plural document display windows (the main window 53 and the sub windows 1-n), each participant in the desktop conference can imitate an actual conference where plural pages of the document are opened and referred at the same time by each participant in addition to the functions realized in the first embodiment, such as to freely refer to the plural pages of the document, personally take a memo and see the document according to the explanation by the document distributor.

In this case, respective pages to be displayed to the main window 53 and the sub windows 1-n can be changed freely. Further, according to the embodiment, an identical page is prevented from being displayed to plural document display windows at the same time on the basis of the table (display area list 230) for managing the plurality of document display windows.

Next, a description will be made to a third embodiment of the present invention. In the third embodiment, when one page of the conference document is changed to another page by the synchronizing participant in the document display synchronism mode, if there is no window which is displaying the changed page of the conference document, a new sub window is automatically generated and the page of the document which had been displayed in the main window 53 just before the page was changed is displayed to the new generated sub window.

Figure 29:
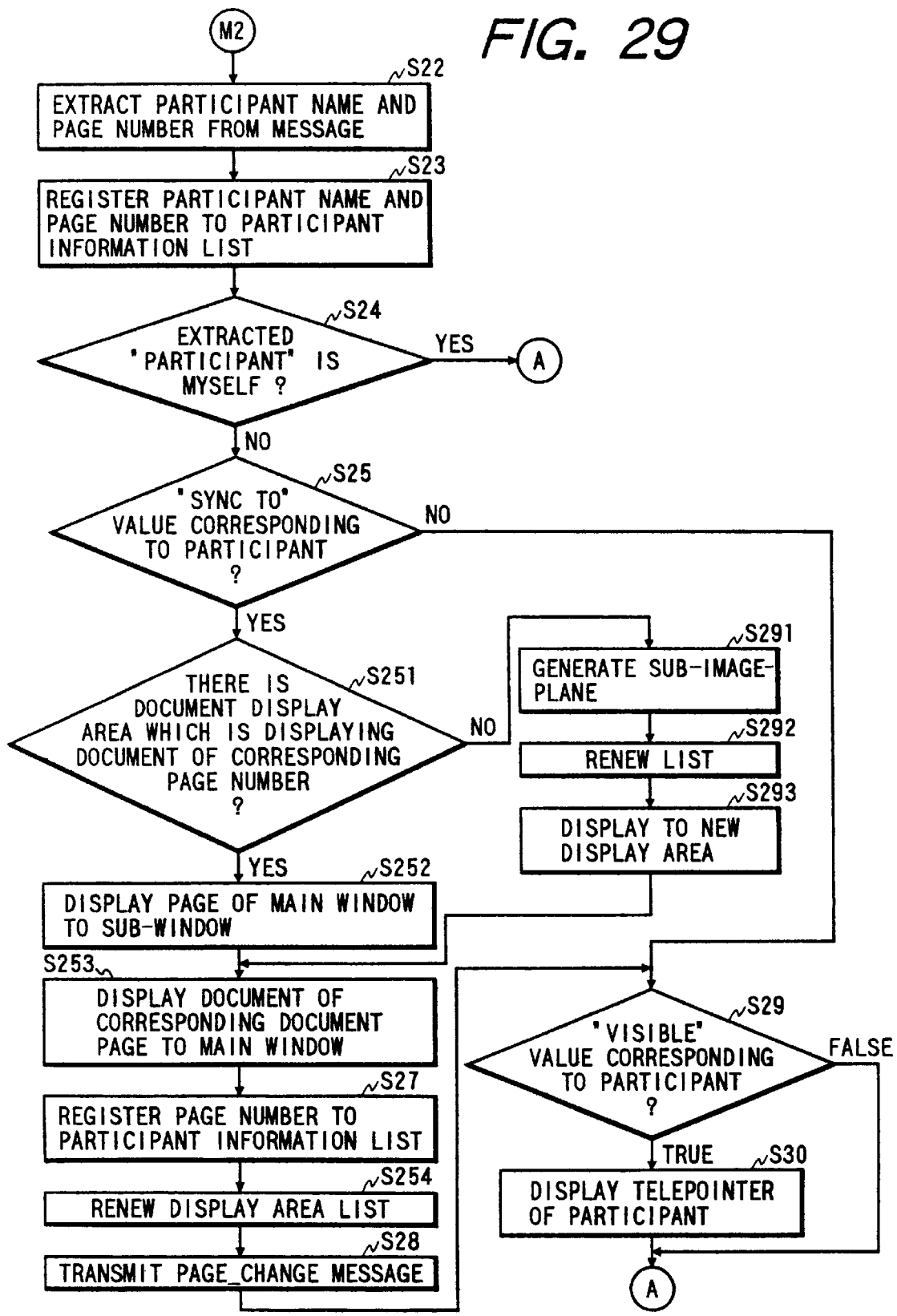
FIG. 29 is a flowchart showing operation of the common document display process in the third embodiment of the present invention.

FIG. 29 is a flowchart showing the processing to be performed when the step S16 branches to M2 in FIG. 24.

In FIG. 29, processing steps identical to those in FIG. 25 are given the same step numbers. The third embodiment is different from the second embodiment in FIG. 25 only in that processing steps S291 to S293 subsequent to step S251 are added to the operation of the second embodiment when there is no document display area displaying the document of a corresponding page number.

When there is no document display area displaying the document of the corresponding page number, a new sub image plane is newly generated at step S291, and the contents of the display area list 230 is renewed at step S292. At the subsequent step S293, the document currently displayed in the main window 53 is displayed to the new generated sub window.

According to the third embodiment, the document which was displayed in the main window 53 until changed by the synchronizing participant in the document display synchronism mode is displayed to a new sub window automatically generated at the mode switching time, and this prevents an inconvenience that each participant can not refer to the document used as reference until the page of the document was changed in the synchronism mode because of switching operation of the display.

Other embodiments of the present invention

The present invention can be suitably applied to both a system constituted with a plurality of devices (such as a host computer, an interface device, a reader, and a printer), and an equipment (e.g., a copy machine, or a facsimile).

The present invention is also accomplished by an apparatus or a system in which software program code set is supplied to the apparatus or a computer in the system connected with devices required for the functions in the above embodiment so that the devices can be operated according to the program stored in the computer of the system or apparatus (CPU or MPU).

In this case, the software program code set itself realizes the functions in the above embodiments. Accordingly, the present invention includes the program code set and a unit for supplying the program data set to the computer such as a storage medium storing the program code set therein.

Several media may be used as the storage medium storing the program code set therein, such as a floppy disk, a hard disk, an optical disk, a magneto-optical disk, a CD-ROM, a magnetic tape, a nonvolatile memory card, and a ROM.

It should be noted that, although the program code set was supplied to the computer for realizing the functions in the above embodiments, the program code set may cooperate with an OS (operating system) running in the computer or other application software to realize the functions in the above embodiments.

Further, after the program code set supplied to the computer was stored in a memory of a function expanded unit connected to the computer or a function extended board mounted in the computer, the function extended board or a CPU included in the function expanded unit may execute portion or all of the actual processing in accordance with instructions of the program code set so that the functions in the above embodiments can be realized.

As described above, according to the embodiments of the present invention, such a conference as it is held in an actual conference using conference documents can be realized in a desktop conferencing system using computers. In other words, a document distributor distributes a plurality of conference documents to participants in the desktop conference and points out a specific portion of a document for explaining the document, so that each participant can look over the conference documents freely at the same time and take a memo as required.

Further, each participant can look at the document synchronously with the other participants, so that no participant loses a portion to which the document distributor is giving an explanation.

What is claimed is:

1. A terminal connected with other terminal through a network, comprising:
   management means for managing a common document, using management information relating to the common document;
   transmitting means for transmitting the common document managed by said management means through the network to the other terminal; and
   supply means for supplying the common document so as to cause the common document to be displayed on a display means,
   wherein the common document is constituted with a layered structure, and
   wherein one layer in the layered structure of the common document is set so as to be changeable by said terminal.

2. A terminal according to claim 1, wherein said management information includes a file name and page number of the common document.

3. A terminal according to claim 1, wherein said management information includes information concerning said terminal, from which the common document was transmitted.

4. A terminal according to claim 3, wherein the information concerning said terminal includes information for identifying said terminal.

5. A terminal according to claim 1, wherein the document is a document for a conference held through the network, and said transmitting means transmits the common document to one or more other terminals which are participating in the conference.

6. A terminal according to claim 1, further comprising display means.

7. A network conferencing system comprising:
   a first terminal, including:
      management means for managing a common document,
      transmitting means for transmitting the common document managed by said management means through a network, and
      supply means for supplying the common document so as to cause the common document to be displayed on a display means of said first terminal; and
   a second terminal, including:
      receiving means for receiving the common documents transmitted by said transmitting means, and
      supply means for supplying the common document received by said receiving means to a display means of said second terminal,
   wherein the common document is constituted with a layered structure, and
   wherein one layer in the layered structure of the common document is set so as to be changeable by said first terminal.

8. A network conferencing system according to claim 7, wherein said management information incudes a file name and page number of the common document.

9. A network conferencing system according to claim 7, wherein said management information includes information concerning the terminal from which the common document was transmitted.

10. A network conferencing system according to claim 9, wherein the information concerning the terminal from which the common document was transmitted includes information for identifying that terminal.

11. A network conferencing system according to claim 7, wherein the common document is a document for a conference held through the network, said transmitting means transmits the common document to one or more other terminals which are participating in the conference.

12. A network conferencing system according to claim 7, further comprising display means.

13. A control method for plural terminals connected through a network, comprising the steps of:

managing a common document,
wherein the common document is constituted with a layered structure, and
wherein one layer in the layered structure of the common document is set so as to be changeable by said first terminal;
transmitting the common document managed in said managing step through the network to one or more other terminals; and
displaying the common document on a display means.

14. A computer memory storing at least the following processing steps to be executed in a computer:

managing a common document,
wherein the common document is constituted with a layered structure, and
wherein one layer in the layered structure of the common document is set so as to be changeable by said first terminal;
transmitting the common document managed in said managing step through a network to one or more other terminals; and
displaying the common document on a display means.

15. A terminal connected with at least one other terminal through a network, comprising:

management means for managing common pictures which are constituted with a layer structure;
transmitting means for transmitting the common pictures managed by said management means through the network to the at least one other terminal; and
supply means for supplying the common pictures so as to cause the common pictures to be displayed on a display means,
wherein at least one layer in the layered structure of the pictures is set so as to be changeable by a predetermined user.

16. A network conferencing system comprising:

a first terminal, including:
  management means for managing common pictures which are constituted with a layer structure;
  transmitting means for transmitting the common pictures managed by said management means through the network to the at least one other terminal; and
  supply means for supplying the common pictures so as to cause the common pictures to be displayed on a display means,
  wherein at least one layer in the layered structure of the pictures is set so as to be changeable by a predetermined user; and a second terminal, including:
  receiving means for receiving the common pictures transmitted by said transmitting means, and
  supply means for supplying the common picture received by said receiving means to a display means of said second terminal.

* * * * *

UNITED STATES PATENT AND TRADEMARK OFFICE
CERTIFICATE OF CORRECTION

PATENT NO. : 5,996,003
DATED : November 30, 1999
INVENTOR(S) : TAKESHI NAMIKATA ET AL.

It is certified that error appears in the above-identified patent and that said Letters Patent is hereby corrected as shown below:

ON THE TITLE PAGE [57] ABSTRACT:

Line 3, "coferencing" should read --conferencing--.

COLUMN 1:

Line 23, "attaining" should read --attending--.

COLUMN 2:

Line 66, "the-first" should read --the first--.

COLUMN 4:

Line 3, "convenience" should read --convenience'--;
    Line 4, "in" should read --in a--; and
    Line 8, "of the" should read --of--.

COLUMN 6:

Line 65, "attaining" should read --attending--.

COLUMN 8:

Line 13, "to" (second occurrence) should read --on--;
    Line 32, "of" should read --of the--.

COLUMN 9:

Line 14, "massage" should read --message--;
    Line 18, "UNVISIBLE" should read --INVISIBLE--; and
    Line 52, "other" should read --another--.

UNITED STATES PATENT AND TRADEMARK OFFICE
CERTIFICATE OF CORRECTION

PATENT NO. : 5,996,003
DATED : November 30, 1999
INVENTOR(S) : TAKESHI NAMIKATA ET AL.

It is certified that error appears in the above-identified patent and that said Letters Patent is hereby corrected as shown below:

COLUMN 11:

Line 62, "POINTER_UNVISIBLE" should read --POINTER_INVISIBLE--.

COLUMN 12:

Line 1, "other" should read --another--.

COLUMN 13:

Line 36, "even" should read --event--;
    Line 52, "a" should read --an--; and
    Line 64, "POINTER_UNVISIBLE" should read --POINTER_INVISIBLE--.

COLUMN 14:

Line 20, "that" should read --for whom--;
    Line 38, "of" should read --of the--;
    Line 46, "to" should read --on--; and
    Line 67, "can not" should read --cannot--.

COLUMN 15:

Line 2, "can not" should read --cannot--;
    Line 8, "can" should read --cannot--; and
    Line 9, delete "not" and "see" should read --see the--.

UNITED STATES PATENT AND TRADEMARK OFFICE
CERTIFICATE OF CORRECTION

PATENT NO. : 5,996,003
DATED : November 30, 1999
INVENTOR(S) : TAKESHI NAMIKATA ET AL.

It is certified that error appears in the above-identified patent and that said Letters Patent is hereby corrected as shown below:

COLUMN 16:

Line 14, "are" should read --is--;
    Line 17, "to" should read --of--;
    Line 50, delete "being"; and
    Line 56, "to" should read --on--.

COLUMN 17:

Line 28, "to" (second occurrence) should read --on-- and "can not" should read --cannot--.

COLUMN 18:

Line 29, "by" should read --than--;
    Line 36, "to" should read --on--;
    Line 45, "to" (second occurrence) should read --on--;
    Line 48, "to" should read --on--;
    Line 52, "to" should read --of--; and
    Line 60, "to" should read --on--.

COLUMN 19:

Line 8, "to" should read --cannot--;
    Line 13, "to" should read --cannot--; and
    Line 15, "can not" should read --cannot--.

UNITED STATES PATENT AND TRADEMARK OFFICE
CERTIFICATE OF CORRECTION

PATENT NO. : 5,996,003
DATED : November 30, 1999
INVENTOR(S) : TAKESHI NAMIKATA ET AL.

It is certified that error appears in the above-identified patent and that said Letters Patent is hereby corrected as shown below:

COLUMN 20:

Line 2, "other" should read --another--.

Signed and Sealed this

Twenty-seventh Day of February, 2001

Attest:

NICHOLAS P. GODICI

Attesting Officer    Acting Director of the United States Patent and Trademark Office